(12) United States Patent
Lee et al.

(10) Patent No.: US 10,554,070 B2
(45) Date of Patent: Feb. 4, 2020

(54) METHOD FOR PERFORMING WIRELESS CHARGING CONTROL OF AN ELECTRONIC DEVICE WITH AID OF SIMPLE RESPONSE INDICATING ACKNOWLEDGEMENT, AND ASSOCIATED APPARATUS

(71) Applicant: MEDIATEK INC., Hsin-Chu (TW)

(72) Inventors: Chi-Min Lee, Hsinchu County (TW); Anand Satyamoorthy, Somerville, MA (US)

(73) Assignee: MediaTek Inc., Hsin-Chu (TW)

( * ) Notice: Subject to any disclaimer, the term of this patent is extended or adjusted under 35 U.S.C. 154(b) by 119 days.

(21) Appl. No.: 15/098,338

(22) Filed: Apr. 14, 2016

(65) Prior Publication Data
US 2016/0233716 A1 Aug. 11, 2016

Related U.S. Application Data

(63) Continuation-in-part of application No. 14/559,884, filed on Dec. 3, 2014, now Pat. No. 9,685,815.
(Continued)

(51) Int. Cl.
*H02J 7/02* (2016.01)
*H04W 8/00* (2009.01)
*H02J 7/00* (2006.01)

(52) U.S. Cl.
CPC .............. *H02J 7/025* (2013.01); *H04W 8/005* (2013.01); *H02J 2007/0001* (2013.01)

(58) Field of Classification Search
CPC .......... H04W 8/005; H02J 7/025; H02J 5/005
(Continued)

(56) References Cited

U.S. PATENT DOCUMENTS 5,245,611 A * 9/1993 Ling ................... H04L 27/2332
370/347
8,928,276 B2 1/2015 Kesler et al.
(Continued)

FOREIGN PATENT DOCUMENTS

CN 101449521 A 6/2009
CN 102130477 A 7/2011
(Continued)

OTHER PUBLICATIONS

Office Action dated Sep. 30, 2016 for U.S. Appl. No. 15/559,884.
(Continued)

*Primary Examiner* — Stacy Whitmore
(74) *Attorney, Agent, or Firm* — Wolf, Greenfield & Sacks, P.C.

(57) ABSTRACT

A method for performing wireless charging control of an electronic device with aid of simple response of a wireless charging device and an associated apparatus are provided, where the wireless charging device may be arranged to wirelessly charge the electronic device, and the method may include: receiving a plurality of packets from the electronic device, wherein each packet of the plurality of packets is utilized for carrying information of wireless charging reports of the electronic device, and comprises unacknowledged header information; and controlling the wireless charging device to generate at least one simple response corresponding to at least one packet of the plurality of packets, to acknowledge the at least one packet of the plurality of packets.

19 Claims, 17 Drawing Sheets

Related U.S. Application Data

(60) Provisional application No. 62/152,206, filed on Apr. 24, 2015, provisional application No. 61/928,093, filed on Jan. 16, 2014, provisional application No. 61/955,459, filed on Mar. 19, 2014.

(58) Field of Classification Search
USPC .......................................................... 320/108
See application file for complete search history.

(56) References Cited

U.S. PATENT DOCUMENTS

| | | | |
|---|---|---|---|
| 9,685,815 B2 | 6/2017 | Lee | |
| 9,906,063 B2 | 2/2018 | Lee | |
| 10,250,067 B2 | 4/2019 | Lee | |
| 2009/0039828 A1* | 2/2009 | Jakubowski | H02J 7/0054 320/106 |
| 2012/0313445 A1 | 12/2012 | Park | |
| 2012/0313448 A1 | 12/2012 | Anttila | |
| 2012/0329405 A1 | 12/2012 | Lee | |
| 2013/0002038 A1 | 1/2013 | Lee et al. | |
| 2013/0083788 A1* | 4/2013 | Ghosh | H04B 1/715 370/347 |
| 2013/0094598 A1 | 4/2013 | Bastami | |
| 2013/0285465 A1* | 10/2013 | Takeda | H01F 38/14 307/104 |
| 2014/0176061 A1 | 1/2014 | Cheatham, III et al. | |
| 2014/0084822 A1 | 3/2014 | Ito et al. | |
| 2014/0167688 A1 | 6/2014 | Doyle et al. | |
| 2014/0176082 A1 | 6/2014 | Visser | |
| 2014/0184147 A1 | 7/2014 | Uchida | |
| 2014/0191568 A1 | 7/2014 | Partovi | |
| 2014/0191717 A1 | 7/2014 | Hong et al. | |
| 2014/0285145 A1 | 9/2014 | Patro et al. | |
| 2014/0298447 A1 | 10/2014 | Chu | |
| 2014/0339916 A1* | 11/2014 | Fells | H02J 5/005 307/104 |
| 2015/0194838 A1* | 7/2015 | Won | H02J 7/025 320/108 |
| 2015/0198640 A1 | 7/2015 | Lee | |
| 2015/0201351 A1 | 7/2015 | Lee | |
| 2016/0007168 A1* | 1/2016 | Bair | H04W 40/00 455/3.06 |
| 2016/0233715 A1 | 8/2016 | Lee | |
| 2016/0233728 A1* | 8/2016 | Park | H04L 1/00 |
| 2017/0331523 A1* | 11/2017 | Won | H02J 5/005 |
| 2018/0138733 A1 | 5/2018 | Lee | |
| 2018/0341760 A1 | 11/2018 | Frempong et al. | |

FOREIGN PATENT DOCUMENTS

| | | |
|---|---|---|
| CN | 102224740 A | 10/2011 |
| CN | 102694423 A | 9/2012 |
| CN | 103370885 A | 10/2013 |
| CN | 103427499 A | 12/2013 |
| CN | 103427862 A | 12/2013 |
| CN | 103457362 A | 12/2013 |
| CN | 104471833 A | 3/2015 |
| JP | 2010028935 A | 2/2010 |
| TW | 201401714 | 1/2014 |
| WO | 02073901 A1 | 9/2002 |
| WO | 2013002437 A1 | 1/2013 |

OTHER PUBLICATIONS

Chi-Min Lee, Title: Method for Performing Wireless Charging Control of an Electronic Device With Aid of Variant Slot Timing and Simple Response Indicating Acknowledgement, and Associated Apparatus, pending U.S. Appl. No. 15/098,328, filed Apr. 14, 2016.
Office Communication dated Oct. 11, 2016 for U.S. Appl. No. 14/307,501.
Office Action dated Sep. 19, 2016 from Chinese Application No. 201510019350.7.
Office Action dated Apr. 20, 2016 for co-pending U.S. Appl. No. 14/307,501.
Office Action dated Oct. 22, 2015 from corresponding Taiwan Patent Application No. TW1042144470.
U.S. Appl. No. 14/307,501, filed Jun. 18, 2014, Lee.
U.S. Appl. No. 14/559,884, filed Dec. 3, 2014, Lee.
U.S. Appl. No. 15/098,328, filed Apr. 14, 2016, Lee.
U.S. Appl. No. 15/870,682, filed Jan. 12, 2018, Lee.

* cited by examiner

| FSK | 6.78 MHz | 6.79 MHz | 6.78 MHz |

METHOD FOR PERFORMING WIRELESS CHARGING CONTROL OF AN ELECTRONIC DEVICE WITH AID OF SIMPLE RESPONSE INDICATING ACKNOWLEDGEMENT, AND ASSOCIATED APPARATUS

CROSS REFERENCE TO RELATED APPLICATION

This application claims the benefit of U.S. Provisional Application No. 62/152,206, which was filed on Apr. 24, 2015, and is included herein by reference. In addition, this application is a continuation-in-part application and claims the benefit of U.S. Non-provisional application Ser. No. 14/559,884, which was filed on Dec. 3, 2014, and is included herein by reference. Additionally, the U.S. Non-provisional application Ser. No. 14/559,884 claims the benefit of U.S. Provisional Application No. 61/955,459, which was filed on Mar. 19, 2014, and further claims the benefit of U.S. Provisional Application No. 61/928,093, which was filed on Jan. 16, 2014.

BACKGROUND

The present invention relates to foreign object detection (FOD) of a wireless power transfer system such as a wireless charging system, and more particularly, to a method for performing wireless charging control, and an associated apparatus.

FOD is a hot topic in the field of the wireless charging technologies since a foreign object may endanger the user of a wireless charging system. For example, a foreign object such as a Digital Versatile Disc (DVD) typically has a thin layer of metal. As the thin layer of metal may be easily heated during wireless charging due to the eddy currents, the DVD can be regarded as a dangerous foreign object. Therefore, when a foreign object is detected, it is better to stop wireless charging.

According to the related art, a conventional FOD method based on power loss detection is typically designed for an inductive wireless charging system, rather than a resonant wireless charging system. In a situation where the conventional FOD method is applied to the inductive wireless charging system, the conventional FOD method can be used for detecting a foreign object near the inductive wireless charging system. However, in a situation where the conventional FOD method is applied to the resonant wireless charging system, some problems may be encountered. For example, it may be observed that there is only a slight difference between the power loss in a first case in which a mobile phone is wirelessly charged in the landscape orientation and the power loss in a second case in which this mobile phone is wirelessly charged in the portrait orientation and a DVD having the size of 8 centimeters (cm) is positioned nearby, which means it is hard to distinguish one of the two cases (e.g. any of the cases A and B) from the other of the two cases. As a result, a false alarm (e.g. the first case is erroneously recognized as the second case) or detection failure (e.g. the second case is erroneously recognized as the first case) may occur.

For the user's safety, the aforementioned detection failure should be prevented. In addition, for the user's convenience, the aforementioned false alarm should be prevented. Thus, when one is trying to implementing a resonant wireless charging system such as that mentioned above according to the conventional FOD method, there is a tradeoff between reducing the probability of the aforementioned false alarm and reducing the probability of the aforementioned detection failure. Thus, a novel method is required to enhance the wireless charging control of a wireless charging system.

SUMMARY

It is an objective of the claimed invention to provide a method for performing wireless charging control, and an associated apparatus, in order to solve the above-mentioned problems.

It is another objective of the claimed invention to provide a method for performing wireless charging control, and an associated apparatus, in order to prevent dangerous foreign objects from making fire during a wireless charging procedure.

It is another objective of the claimed invention to provide a method for performing wireless charging control, and an associated apparatus, in order to prevent non-dangerous foreign objects from interrupting a wireless charging procedure.

According to at least one preferred embodiment, a method for performing wireless charging control of an electronic device with aid of simple response of a wireless charging device is provided, where the wireless charging device (e.g. a wireless charging transmitter) is arranged to wirelessly charge the electronic device, and the method may comprise the steps of: receiving at least one packet from the electronic device, wherein the at least one packet is utilized for carrying information of wireless charging reports of the electronic device; and controlling the wireless charging device to generate at least one simple response (e.g. the at least one simple response corresponding to the at least one packet), to acknowledge the at least one packet. For example, the at least one packet may comprise a plurality of packets from the electronic device, and each packet of the plurality of packets may be utilized for carrying information of wireless charging reports of the electronic device, and may comprise unacknowledged header information. According to some embodiments, an apparatus for performing wireless charging control according to the above method is provided, where the apparatus may comprise at least one portion (e.g. a portion or all) of the wireless charging device (e.g. the wireless charging transmitter).

According to at least one preferred embodiment, an apparatus for performing wireless charging control of an electronic device with aid of simple response of a wireless charging device is provided, where the wireless charging device (e.g. the wireless charging transmitter) is arranged to wirelessly charge the electronic device, and the apparatus may comprise at least one portion (e.g. a portion or all) of the wireless charging device. For example, the apparatus may comprise a transmitter (Tx) that is positioned within the wireless charging device, and may further comprise a control circuit that is positioned within the wireless charging device and coupled to the Tx. The Tx may be arranged for outputting a Tx current, and the control circuit may be arranged for receiving at least one packet from the electronic device through a power output coil of the wireless charging device, wherein the at least one packet is utilized for carrying information of wireless charging reports of the electronic device. In addition, the control circuit may be further arranged for controlling the wireless charging device to generate, by using the Tx, at least one simple response (e.g. the at least one simple response corresponding to the at least one packet), to acknowledge the at least one packet. For example, the at least one packet may comprise a plurality of packets from the electronic device, and each packet of the plurality of packets may be utilized for carrying information of wireless charging reports of the electronic device, and may comprise unacknowledged header information. In some embodiments, the apparatus may comprise a Tx power amplifier (Tx PA) that is positioned within the transmitter (Tx), and the Tx PA may be arranged for outputting a Tx PA current utilized as the Tx current, where the control circuit is coupled to the Tx PA.

It is an advantage of the present invention that the present invention method and the associated apparatus can accurately determine whether a foreign object is detected, and can accurately determine whether a foreign object is a dangerous foreign object or a non-dangerous foreign object, and therefore the related art problems such as the aforementioned false alarm or the aforementioned detection failure can be prevented. More particularly, in a situation where the wireless charging transmitter is a resonant wireless charging transmitter, the present invention method and the associated apparatus can properly perform FOD with aid of admittance detection and/or impedance detection, and can temporarily stop a wireless charging procedure when needed, and therefore can prevent dangerous foreign objects from making fire during the wireless charging procedure and can prevent non-dangerous foreign objects from interrupting the wireless charging procedure. As a result, both of the performance of the wireless charging transmitter and the safety of the user of the wireless charging transmitter can be guaranteed.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
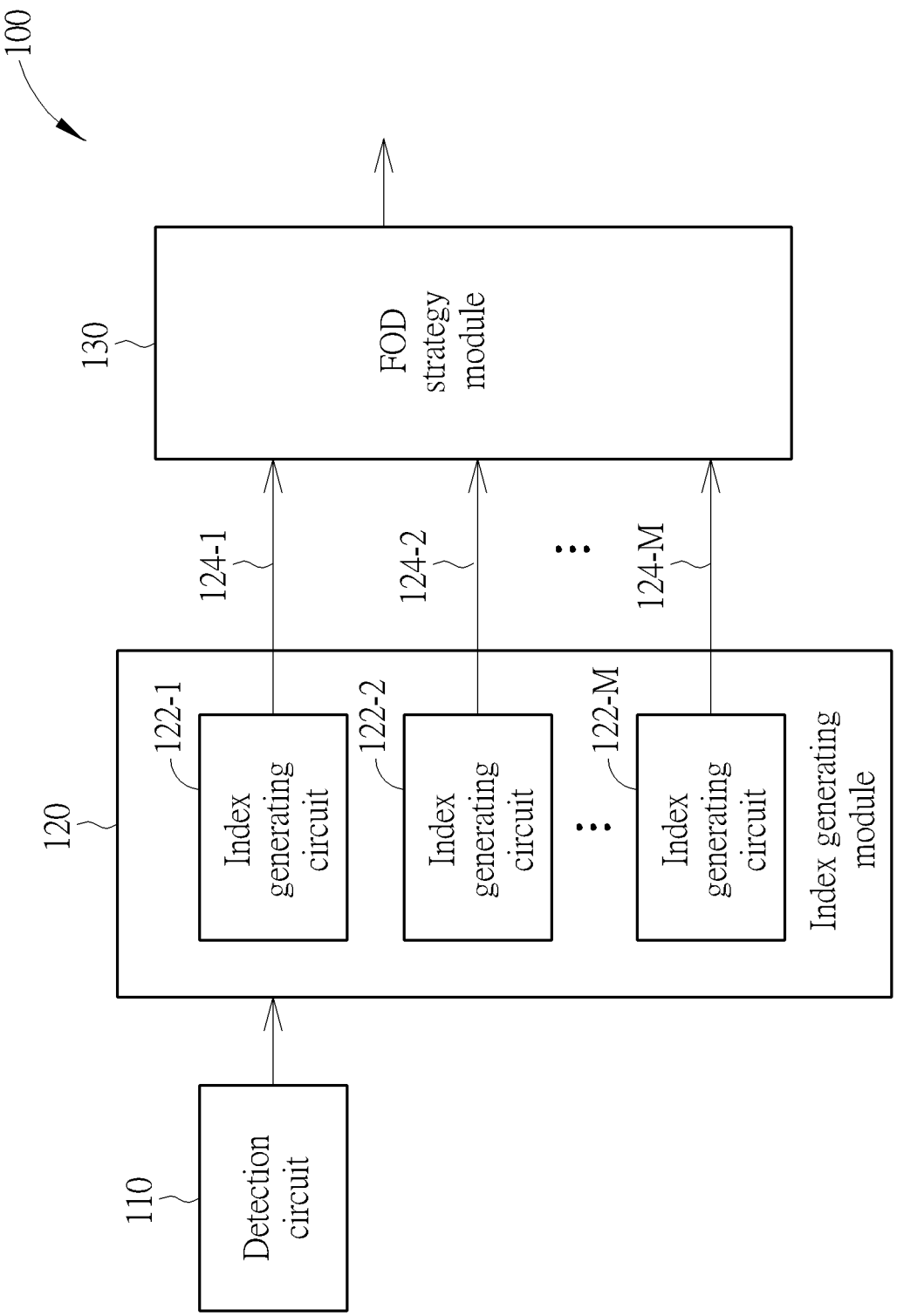
FIG. 1 is a diagram of an apparatus for performing wireless charging control according to an embodiment of the present invention.

Please refer to FIG. 1, which illustrates a diagram of an apparatus 100 for performing wireless charging control according to an embodiment of the present invention, where the apparatus 100 may comprise at least one portion (e.g. a portion or all) of a wireless charging device. For example, the apparatus 100 may comprise a portion of the wireless charging device mentioned above, and more particularly, can be at least one hardware circuit such as at least one integrated circuit (IC) within the wireless charging device and associated circuits thereof. In another example, the apparatus 100 can be the whole of the wireless charging device mentioned above. In another example, the apparatus 100 may comprise a system comprising the wireless charging device mentioned above (e.g. a wireless power transfer system comprising the wireless charging device). Examples of the wireless charging device may include, but not limited to, a wireless charging transmitter (which can also be referred to as the transmitter, for brevity) such as a transmitter pad. For example, the aforementioned wireless charging transmitter such as the transmitter pad can be utilized for wirelessly charging a wireless charging receiver (which can also be referred to as the receiver, for brevity) such as a portable electronic device, where examples of the portable electronic device may include, but not limited to, a mobile phone (e.g. a multifunctional mobile phone), a personal digital assistant (PDA), and a personal computer such as a laptop computer.

As shown in FIG. 1, the apparatus 100 may comprise at least one detection circuit (e.g. one or more detection circuits), which can be collectively referred to as the detection circuit 110 in this embodiment, and may further comprise an index generating module 120, which may comprise a set of index generating circuits that is coupled to the aforementioned at least one detection circuit such as the detection circuit 110 shown in FIG. 1. For example, the number of index generating circuits within the set of index generating circuits mentioned above may be equal to M (e.g. the notation M may represent a positive integer that is greater than one). That is, the set of index generating circuits may comprise M index generating circuits 122-1, 122-2, . . . , and 122-M. In this embodiment, the apparatus 100 may further comprise a foreign object detection (FOD) strategy module 130, where the FOD strategy module 130 is coupled to the set of index generating circuits mentioned above, such as the M index generating circuits 122-1, 122-2, . . . , and 122-M.

According to this embodiment, the aforementioned at least one detection circuit such as the detection circuit 110 shown in FIG. 1 is arranged for performing current detection and voltage detection to monitor a driving current $I_{DRV}$ (not shown in FIG. 1) and a driving voltage $V_{DRV}$ (not shown in FIG. 1) within the wireless charging transmitter, respectively, where the driving current $I_{DRV}$ and the driving voltage $V_{DRV}$ are utilized for driving a power output coil (not shown in FIG. 1) of the wireless charging transmitter. In addition, the set of index generating circuits mentioned above, such as the M index generating circuits 122-1, 122-2, . . . , and 122-M, is arranged for generating a set of indexes such as M indexes 124-1, 124-2, . . . , and 124-M at least according to the driving current $I_{DRV}$ and the driving voltage $V_{DRV}$, respectively. More particularly, the set of indexes may comprise a power loss index indicating the power loss of a wireless charging operation performed by the wireless charging transmitter, and may further comprise an admittance-related index corresponding to any of the ratio of the driving current $I_{DRV}$ to the driving voltage $V_{DRV}$ or the reciprocal of the ratio of the driving current $I_{DRV}$ to the driving voltage $V_{DRV}$. For example, in a situation where the admittance-related index corresponds to the ratio of the driving current $I_{DRV}$ to the driving voltage $V_{DRV}$, the admittance-related index can be an admittance deviation index. In another example, in a situation where the admittance-related index corresponds to the reciprocal of the ratio of the driving current $I_{DRV}$ to the driving voltage $V_{DRV}$, the admittance-related index can be an impedance deviation index. Additionally, the FOD strategy module 130 is arranged for performing wireless charging FOD according to the set of indexes mentioned above, such as the M index generating circuits 122-1, 122-2, . . . , and 122-M.

As mentioned, the set of indexes may comprise the power loss index indicating the power loss of the wireless charging operation performed by the wireless charging transmitter, and may further comprise the admittance-related index corresponding to any of the ratio of the driving current $I_{DRV}$ to the driving voltage $V_{DRV}$ or the reciprocal of the ratio of the driving current $I_{DRV}$ to the driving voltage $V_{DRV}$. This is for illustrative purposes only, and is not meant to be a limitation of the present invention. In some examples, the set of indexes may further comprise a current-related index corresponding to the driving current $I_{DRV}$.

In some examples, the set of indexes may comprise the power loss index indicating the power loss of the wireless charging operation performed by the wireless charging transmitter, and may further comprise the current-related index corresponding to the driving current $I_{DRV}$, where it is unnecessary to generate the admittance-related index corresponding to any of the ratio of the driving current $I_{DRV}$ to the driving voltage $V_{DRV}$ or the reciprocal of the ratio of the driving current $I_{DRV}$ to the driving voltage $V_{DRV}$.

In some examples, the set of indexes may comprise the admittance-related index corresponding to any of the ratio of the driving current $I_{DRV}$ to the driving voltage $V_{DRV}$ or the reciprocal of the ratio of the driving current $I_{DRV}$ to the driving voltage $V_{DRV}$, and may further comprise the current-related index corresponding to the driving current $I_{DRV}$, where it is unnecessary to generate the power loss index indicating the power loss of the wireless charging operation performed by the wireless charging transmitter.

Figure 2:
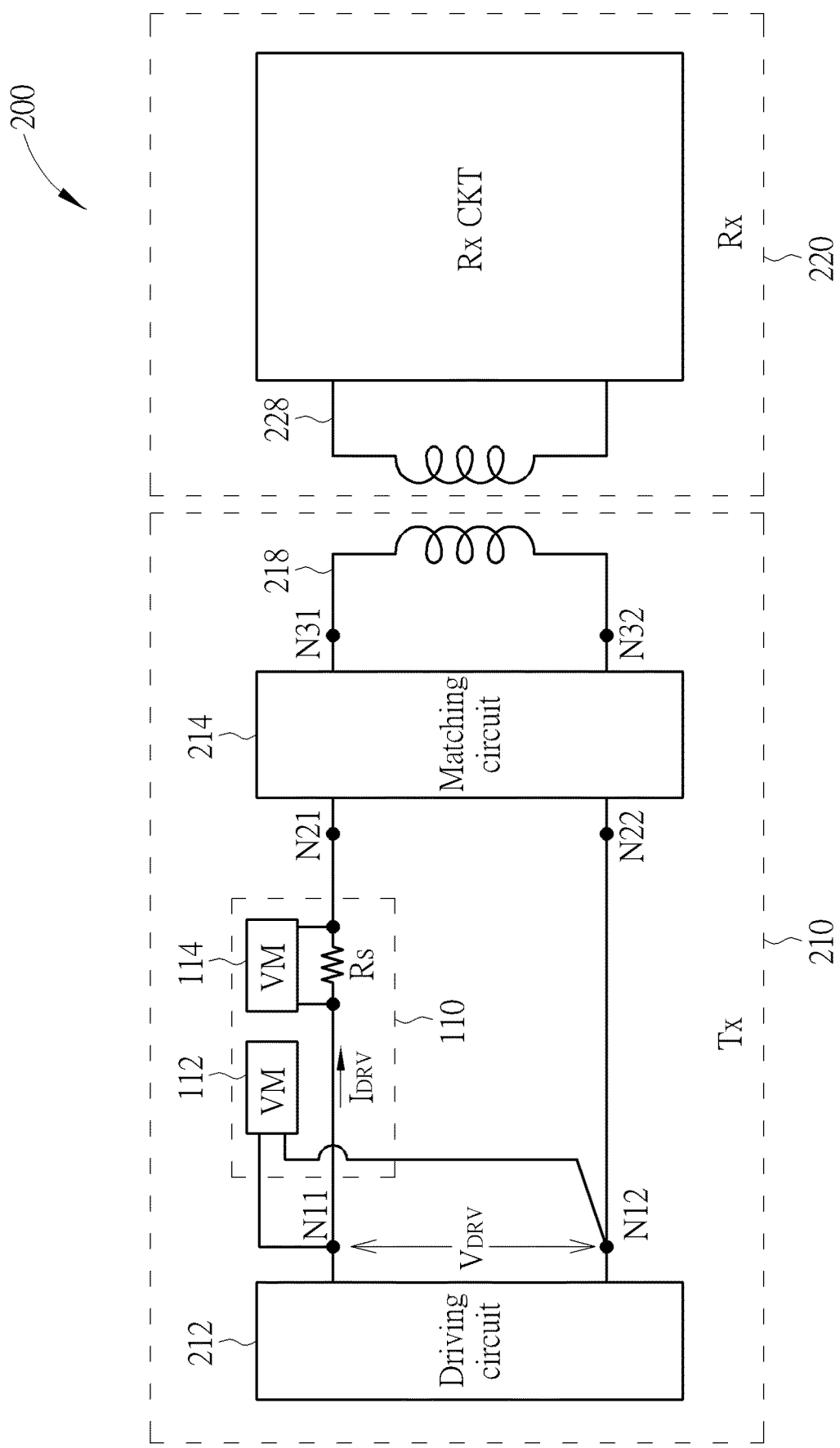
FIG. 2 is a diagram of a wireless power transfer system according to an embodiment of the present invention.

FIG. 2 is a diagram of a wireless power transfer system 200 according to an embodiment of the present invention. As shown in FIG. 2, the wireless power transfer system 200 may comprise a wireless charging transmitter 210 (labeled "Tx" in FIG. 2, for brevity) and a wireless charging receiver 220 (labeled "Rx" in FIG. 2, for brevity), where the wireless charging transmitter 210 shown in FIG. 2 can be taken as an example of the wireless charging transmitter mentioned in the embodiment shown in FIG. 1, and the wireless charging receiver 220 can be taken as an example of the wireless charging receiver mentioned in the embodiment shown in FIG. 1.

According to this embodiment, the wireless charging transmitter 210 may comprise the detection circuit 110 shown in FIG. 1, and the detection circuit 110 of this embodiment may comprise a voltage meter 112 (labeled "VM" in FIG. 2, for brevity) and a current meter. For example, the current meter of this embodiment may comprise a voltage meter 114 (labeled "VM" in FIG. 2, for brevity) and a sensing resistor $R_S$. In addition to the detection circuit 110, the wireless charging transmitter 210 may comprise a driving circuit 212, a matching circuit 214, and a power output coil 218, where the power output coil 218 shown in FIG. 2 can be taken as an example of the power output coil mentioned in the embodiment shown in FIG. 1. In addition, the wireless charging receiver 220 may comprise a power input coil 228, and may further comprise a wireless charging receiver circuit (labeled "Rx CKT" in FIG. 2, for brevity) for performing wireless charging control, where the wireless charging receiver circuit may comprise some components such as some hardware circuits. For example, in a situation where a portable electronic device such as that mentioned in the embodiment shown in FIG. 1 does not have the capability of being wirelessly charged (e.g. this portable electronic device does not have any power input coil for wirelessly receiving power from the wireless charging transmitter 210), the wireless charging receiver 220 can be a charging module, and can be arranged for charging this portable electronic device by utilizing the power that is wirelessly obtained from the wireless charging transmitter 210. More particularly, when needed, the charging module can be electrically connected to the portable electronic device to charge this portable electronic device by using at least one portion (e.g. a portion or all) of the power that is wirelessly obtained from the wireless charging transmitter 210, where the charging module can be detached from this portable electronic device when charging this portable electronic device in this manner is not required. This is for illustrative purposes only, and is not meant to be a limitation of the present invention. In some examples, in a situation where a portable electronic device such as that mentioned in the embodiment shown in FIG. 1 has the capability of being wirelessly charged, the wireless charging receiver 220 may comprise the whole of this portable electronic device. Thus, in addition to the aforementioned wireless charging receiver circuit (labeled "Rx CKT" in FIG. 2), the wireless charging receiver 220 may further comprise at least one processor (e.g. one or more processors), the associated control circuit thereof, and at least one storage module (e.g. a hard disk drive (HDD), and/or a non-volatile (NV) memory such as a Flash memory).

In this embodiment, the driving circuit 212 is arrange for generating the driving voltage $V_{DRV}$ and the driving current $I_{DRV}$, and is arrange for utilizing the driving voltage $V_{DRV}$ and the driving current $I_{DRV}$ to drive the power output coil 218 through the matching circuit 214, in order to wirelessly output power toward at least one wireless charging receiver (e.g. one or more wireless charging receivers) outside the wireless charging transmitter 210, such as the wireless charging receiver 220 shown in FIG. 2. As shown in FIG. 2, the two input terminals of the voltage meter 112 are coupled to the two output terminals N11 and N12 of the driving circuit 212, respectively, and is arranged for detecting the driving voltage $V_{DRV}$ between the two output terminals N11 and N12. In addition, the two input terminals of the voltage meter 114 are coupled to the two terminals of the sensing resistor $R_S$, and is arranged for detecting the voltage difference between the two terminals of the sensing resistor $R_S$. Thus, the detection circuit 110 may perform a calculation operation according to the voltage difference between the two terminals of the sensing resistor $R_S$ and the resistance value of the sensing resistor $R_S$, and more particularly, may divide the voltage difference between the two terminals of the sensing resistor $R_S$ by the resistance value of the sensing resistor $R_S$, to detect the driving current $I_{DRV}$. In practice, the matching circuit 214 may comprise some impedance components such as some capacitors, for enhancing the power output performance of the power output coil 218, where the two output terminals N31 and N32 of the matching circuit 214 are coupled to the two input terminals N21 and N22 of the matching circuit 214, respectively.

For better comprehension, some implementation details of the aforementioned wireless charging receiver circuit (labeled "Rx CKT" in FIG. 2) can be described as follows. The wireless charging receiver circuit may comprise a matching circuit and a rectifier that are positioned on a power transfer path of the wireless charging receiver circuit. For example, this matching circuit may comprise some impedance components such as some capacitors, for enhancing the power input performance of the power input coil 228, and the rectifier can be arranged for converting the alternating current (AC) power obtained from the power input coil 228 through this matching circuit into the direct current (DC) power, and more particularly, into a DC output voltage, where the DC output voltage output from the rectifier can be utilized by the portable electronic device. This is for illustrative purposes only, and is not meant to be a limitation of the present invention. In another example, the wireless charging receiver circuit mentioned above may further comprise a low dropout (LDO) regulator that is also positioned on the power transfer path of the wireless charging receiver circuit, and the LDO regulator is arranged for regulating the DC output voltage output from the rectifier, to generate a regulated output voltage for being utilized by the portable electronic device. In some examples, the wireless charging receiver circuit may comprise a detection module, whose architecture may be similar to that of the detection circuit 110 shown in FIG. 2, and therefore can be utilized for detecting or estimating the received power of the wireless charging receiver 220 (e.g. the power that the wireless charging receiver 220 wirelessly obtains from the wireless charging transmitter 210). More particularly, the wireless charging receiver 220 may send at least one packet (e.g. one or more packets) toward the wireless charging transmitter 210 through the power input coil 228, where the aforementioned at least one packet may carry received power information indicating the aforementioned received power of the wireless charging receiver 220. As a result, the wireless charging transmitter 210 may receive the aforementioned at least one packet from the wireless charging receiver 220 through the power output coil 218, and may determine the received power of the wireless charging receiver 220 according to the aforementioned received power information carried by the aforementioned at least one packet.

Based on the architecture shown in FIG. 2, the apparatus 100 of this embodiment may comprise at least one portion (e.g. a portion or all) of the wireless power transfer system 200. For example, the apparatus 100 may comprise a portion of the wireless power transfer system 200, and more particularly, may comprise a portion of the wireless charging transmitter 210, which means the apparatus 100 may comprise some components within the wireless charging transmitter 210 shown in FIG. 2. In another example, the apparatus 100 may comprise a portion of the wireless power transfer system 200, and more particularly, can be the whole of the wireless charging transmitter 210, which means the apparatus 100 may comprise all components within the wireless charging transmitter 210. In another example, the apparatus 100 can be the whole of the wireless power transfer system 200.

In addition, based on the architecture shown in FIG. 2, electric power may be transferred from the left side (e.g. the DC power input into the driving circuit 212 shown in the leftmost of FIG. 2) to the right side (e.g. the DC power provided by the wireless charging receiver circuit shown in the rightmost of FIG. 2, such as the DC power to be utilized by the portable electronic device) stage by stage, where power loss may occur in some of the stages in this architecture. In a situation where a foreign object, such as a metallic object or magnetic object, occasionally drops nearby and starts absorbing energy from the wireless charging transmitter 210 of this embodiment, the wireless charging receiver 220 (more particularly, a controller therein) may detect or estimate the received power of the wireless charging receiver 220 (e.g. the power that the wireless charging receiver 220 wirelessly obtains from the wireless charging transmitter 210) and send a received power report corresponding to the received power (e.g. a received power report packet such as any packet within the aforementioned at least one packet, where the received power report packet may carry an estimated value of the received power) to the wireless charging transmitter 210 through related components (e.g. a communications module in the wireless charging receiver 220, the aforementioned matching circuit of the wireless charging receiver 220, the power input coil 228, and the power output coil 218). As a result, the apparatus 100 may perform power loss detection according to the driving current $I_{DRV}$ and the driving voltage $V_{DRV}$ and according to the received power of the wireless charging receiver 220, to generate the power loss index mentioned above. Further, the wireless charging transmitter 210 (more particularly, the FOD strategy module 130 in the apparatus 100 shown in FIG. 1) may perform the aforementioned wireless charging FOD according to the set of indexes mentioned above, such as the M index generating circuits 122-1, 122-2, . . . , and 122-M. Under control of the FOD strategy module 130, the wireless charging transmitter 210 may temporarily stop outputting power toward the wireless charging receiver 220 when needed, where the related art problems such as the aforementioned false alarm or the aforementioned detection failure can be prevented.

More particularly, in a situation where the wireless charging transmitter 210 is a resonant wireless charging transmitter, the apparatus 100 (and the associated method thereof) can properly perform FOD with aid of admittance detection and/or impedance detection, and can temporarily stop a wireless charging procedure when needed, and therefore can prevent dangerous foreign objects from making fire during the wireless charging procedure and can prevent non-dangerous foreign objects from interrupting the wireless charging procedure. As a result, both of the performance of the wireless power transfer system 200 (more particularly, the performance of the wireless charging transmitter 210) and the safety of the user of the wireless power transfer system 200 (more particularly, the safety of the user of the wireless charging transmitter 210) can be guaranteed.

Figure 3:
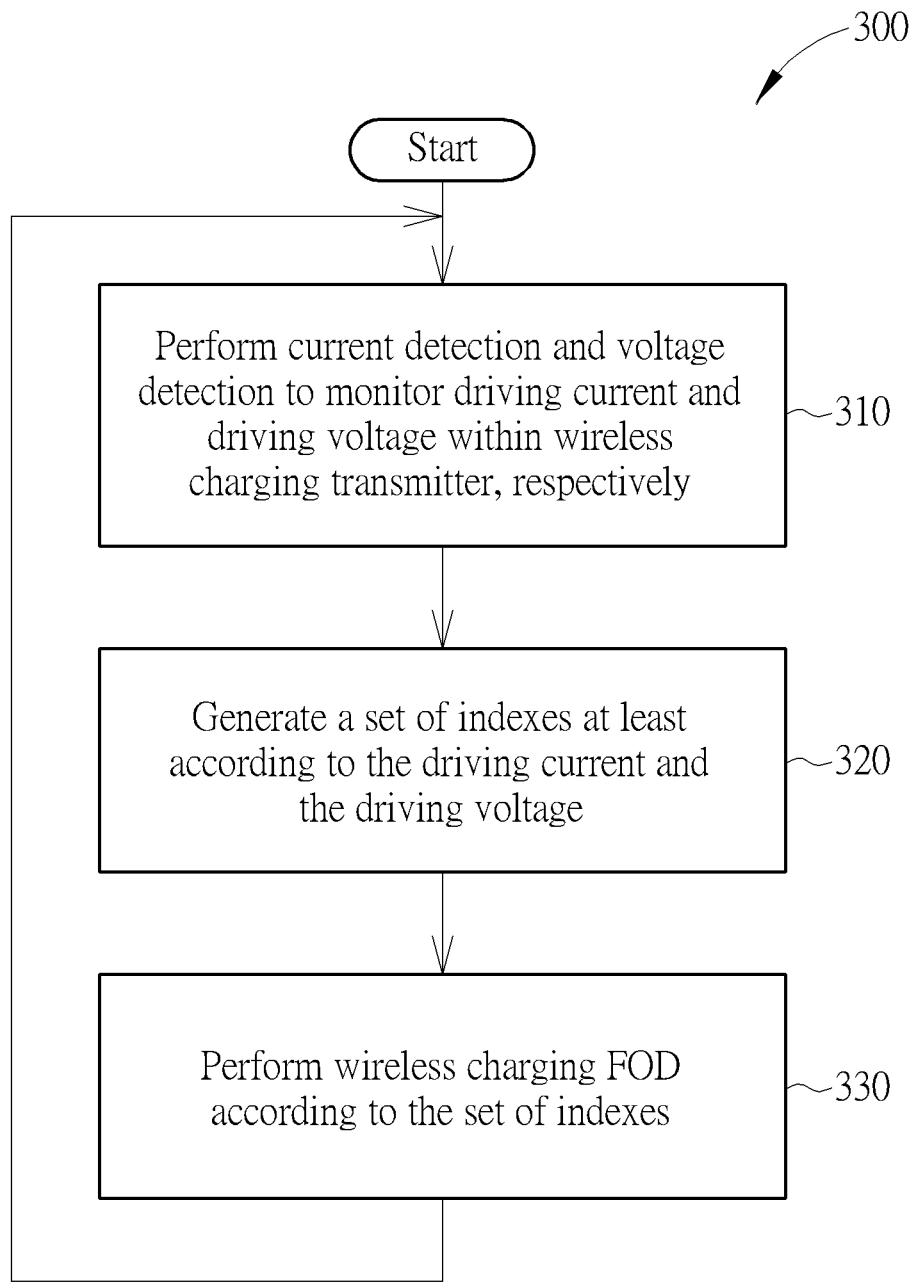
FIG. 3 illustrates a flowchart of a method for performing wireless charging control according to an embodiment of the present invention.

FIG. 3 illustrates a flowchart of a method 300 for performing wireless charging control according to an embodiment of the present invention. The method 300 shown in FIG. 3 can be applied to the apparatus 100 shown in FIG. 1 (more particularly, the wireless power transfer system 200 of the embodiment shown in FIG. 2), and can be applied to the FOD strategy module 130 thereof. The method can be described as follows.

In Step 310, the aforementioned at least one detection circuit such as the detection circuit 110 in any of the embodiments respectively shown in FIG. 1 or FIG. 2 performs the aforementioned current detection and the aforementioned voltage detection to monitor the driving current $I_{DRV}$ and the driving voltage $V_{DRV}$ within the wireless charging transmitter 210, respectively, where the driving current $I_{DRV}$ and the driving voltage $V_{DRV}$ are utilized for driving the power output coil 218 of the wireless charging transmitter 210.

In Step 320, the set of index generating circuits mentioned above, such as the M index generating circuits 122-1, 122-2, . . . , and 122-M shown in FIG. 1, generates the set of indexes such as the M indexes 124-1, 124-2, . . . , and 124-M shown in FIG. 1 at least according to the driving current $I_{DRV}$ and the driving voltage $V_{DRV}$, respectively. For example, the set of indexes may comprise the power loss index indicating the power loss of the wireless charging operation performed by the wireless charging transmitter 210, and may further comprise the admittance-related index corresponding to any of the ratio of the driving current $I_{DRV}$ to the driving voltage $V_{DRV}$ or the reciprocal of the ratio of the driving current $I_{DRV}$ to the driving voltage $V_{DRV}$. This is for illustrative purposes only, and is not meant to be a limitation of the present invention. In some examples, the set of indexes may further comprise a current-related index corresponding to the driving current $I_{DRV}$.

In some examples, the set of indexes may comprise the power loss index indicating the power loss of the wireless charging operation performed by the wireless charging transmitter, and may further comprise the current-related index corresponding to the driving current $I_{DRV}$, where it is unnecessary to generate the admittance-related index corresponding to any of the ratio of the driving current $I_{DRV}$ to the driving voltage $V_{DRV}$ or the reciprocal of the ratio of the driving current $I_{DRV}$ to the driving voltage $V_{DRV}$.

In some examples, the set of indexes may comprise the admittance-related index corresponding to any of the ratio of the driving current $I_{DRV}$ to the driving voltage $V_{DRV}$ or the reciprocal of the ratio of the driving current $I_{DRV}$ to the driving voltage $V_{DRV}$, and may further comprise the current-related index corresponding to the driving current $I_{DRV}$, where it is unnecessary to generate the power loss index indicating the power loss of the wireless charging operation performed by the wireless charging transmitter.

In Step 330, the FOD strategy module 130 performs the aforementioned wireless charging FOD according to the set of indexes mentioned above, such as the M index generating circuits 122-1, 122-2, . . . , and 122-M. More particularly, the FOD strategy module 130 may determine a set of threshold corresponding to a set of FOD strategy control parameters according to a predetermined relationship between the set of threshold and the set of FOD strategy control parameters, and may compare the set of indexes with the set of threshold to generate a set of comparison results, respectively, and may further generate a wireless charging control signal (e.g. the output of the FOD strategy module 130 shown in FIG. 1) according to the set of comparison results, for controlling whether to temporarily stop wireless charging or not. For example, the predetermined relationship between the set of threshold and the set of FOD strategy control parameters may be obtained from a database that is prepared in advance within the wireless charging transmitter 210 (or a look up table (LUT) that is prepared in advance within the wireless charging transmitter 210).

In practice, for better flexibility of calibrating at least one FOD strategy (e.g. one or more FOD strategies) of the FOD strategy module 130, the FOD strategy module 130 may comprise at least one database (e.g. one or more databases) which may comprise the database mentioned above, and the aforementioned at least one database can be utilized for storing strategy information of the aforementioned at least one FOD strategy. More particularly, according to the strategy information of the aforementioned at least one FOD strategy, such as the strategy information that is stored in the aforementioned at least one database, the FOD strategy module 130 may dynamically adjust at least one adjustable threshold (e.g. one or more adjustable thresholds), which can be utilized for performing the aforementioned wireless charging FOD according to the set of indexes mentioned above. This is for illustrative purposes only, and is not meant to be a limitation of the present invention. In some examples, the aforementioned at least one database can be positioned outside the FOD strategy module 130, and the FOD strategy module 130 may obtain the strategy information of the aforementioned at least one FOD strategy from the aforementioned at least one database, where the aforementioned at least one database can be positioned within the wireless charging transmitter 210.

In some examples, the FOD strategy module 130 may comprise at least one LUT (e.g. one or more LUTs) which may comprise the LUT mentioned above, and the aforementioned at least one LUT can be utilized for storing strategy information of the aforementioned at least one FOD strategy. More particularly, according to the strategy information of the aforementioned at least one FOD strategy, such as the strategy information that is stored in the aforementioned at least one LUT, the FOD strategy module 130 may dynamically adjust the aforementioned at least one adjustable threshold (e.g. one or more adjustable thresholds), which can be utilized for performing the aforementioned wireless charging FOD according to the set of indexes mentioned above. This is for illustrative purposes only, and is not meant to be a limitation of the present invention. In some examples, the aforementioned at least one LUT can be positioned outside the FOD strategy module 130, and the FOD strategy module 130 may obtain the strategy information of the aforementioned at least one FOD strategy from the aforementioned at least one LUT, where the aforementioned at least one LUT can be positioned within the wireless charging transmitter 210.

In some examples, the FOD strategy module 130 may comprise both of the aforementioned at least one database (e.g. one or more databases) and the aforementioned at least one LUT (e.g. one or more LUTs), and the aforementioned at least one database and the aforementioned at least one LUT can be utilized for storing the strategy information of the aforementioned at least one FOD strategy. More particularly, according to the strategy information of the aforementioned at least one FOD strategy, such as the strategy information that is stored in the aforementioned at least one database and the strategy information that is stored in the aforementioned at least one LUT, the FOD strategy module 130 may dynamically adjust the aforementioned at least one adjustable threshold (e.g. one or more adjustable thresholds), which can be utilized for performing the aforementioned wireless charging FOD according to the set of indexes mentioned above. This is for illustrative purposes only, and is not meant to be a limitation of the present invention. In some examples, the aforementioned at least one database and/or the aforementioned at least one LUT (e.g. the aforementioned at least one database, or the aforementioned at least one LUT, or both of the aforementioned at least one database and the aforementioned at least one LUT) can be positioned outside the FOD strategy module 130, and the FOD strategy module 130 may obtain the strategy information of the aforementioned at least one FOD strategy from the aforementioned at least one database and the aforementioned at least one LUT, where the aforementioned at least one database and the aforementioned at least one LUT can be positioned within the wireless charging transmitter 210.

In some examples, for better flexibility of calibrating the aforementioned at least one FOD strategy (e.g. one or more FOD strategies) of the FOD strategy module 130, the FOD strategy module 130 can be implemented with a processing circuit running a set of program codes, such as a controller or a processor, where the set of program codes can be prepared in advance and can be stored in a storage module within the wireless charging transmitter 210 (e.g. a non-volatile (NV) memory such as a Flash memory or any of other types of NV memories, or a hard disk drive (HDD)) in advance.

Please note that the operation of Step 310, the operation of Step 320, and the operation of Step 330 are illustrated in FIG. 3, respectively. This is for illustrative purposes only, and is not meant to be a limitation of the present invention. According to some variations of this embodiment, at least one portion (e.g. a portion or all) of the operation of Step 310, at least one portion (e.g. a portion or all) of the operation of Step 320, and/or at least one portion (e.g. a portion or all) of the operation of Step 330 can be performed at the same time. For example, at least one portion (e.g. a portion or all) of the operation of Step 310 and at least one portion (e.g. a portion or all) of the operation of Step 320 can be performed at the same time. In another example, at least one portion (e.g. a portion or all) of the operation of Step 320 and at least one portion (e.g. a portion or all) of the operation of Step 330 can be performed at the same time.

For better comprehension, some implementation details regarding the set of indexes mentioned in Step 320 can be described as follows. Regarding the power loss index mentioned above, the apparatus 100 may determine the charging power output from the wireless charging transmitter 210 (e.g. the power that the wireless charging transmitter 210 wirelessly outputs toward the aforementioned at least one wireless charging receiver such as the wireless charging receiver 220) according to the driving current $I_{DRV}$ and the driving voltage $V_{DRV}$, where the charging power output from the wireless charging transmitter 210 can be referred to as the transmitter power (which can also be referred to as the Tx power in some embodiments, for brevity). For example, the apparatus 100 may determine the transmitter power by calculating the product of the driving current $I_{DRV}$ and the driving voltage $V_{DRV}$. In addition to the transmitter power, the apparatus 100 may determine the received power of the aforementioned at least one wireless charging receiver according to at least one received power report obtained from the aforementioned at least one wireless charging receiver (e.g. the aforementioned received power report obtained from the wireless charging receiver 220), where the received power of the aforementioned at least one wireless charging receiver can be referred to as the receiver power (which can also be referred to as the Rx power in some embodiments, for brevity). In addition, the apparatus 100 (more particularly, an index generating circuit within the M index generating circuits 122-1, 122-2, . . . , and 122-M, such as the index generating circuit 122-1) may further generate the power loss index according to the charging power output from the wireless charging transmitter 210 (e.g. the power that the wireless charging transmitter 210 wirelessly outputs toward the aforementioned at least one wireless charging receiver such as the wireless charging receiver 220) and according to the received power of the aforementioned at least one wireless charging receiver. In some embodiments, the power loss index can be referred to as the power loss, for brevity.

Regarding the admittance-related index mentioned above, in a situation where the admittance-related index corresponds to the ratio of the driving current $I_{DRV}$ to the driving voltage $V_{DRV}$, the apparatus 100 may determine the received power of the aforementioned at least one wireless charging receiver according to the aforementioned at least one received power report obtained from the aforementioned at least one wireless charging receiver, and may determine a normalized transmitter admittance parameter (which can also be referred to as the normalized Tx admittance, for brevity) corresponding to the received power of the aforementioned at least one wireless charging receiver according to a predetermined relationship between the normalized transmitter admittance parameter and the received power of the aforementioned at least one wireless charging receiver. For example, the predetermined relationship between the normalized transmitter admittance parameter and the received power of the aforementioned at least one wireless charging receiver may be obtained from a database such as that mentioned above (or another LUT in the wireless charging transmitter 210) within the wireless charging transmitter 210. In addition, a specific index generating circuit within the set of index generating circuits (e.g. an index generating circuit within the M index generating circuits 122-1, 122-2, . . . , and 122-M, such as the index generating circuit 122-3) may calculate a difference between the ratio of the driving current $I_{DRV}$ to the driving voltage $V_{DRV}$ and the normalized transmitter admittance parameter mentioned above to generate the admittance-related index, where the ratio of the driving current $I_{DRV}$ to the driving voltage $V_{DRV}$ can be referred to as the transmitter admittance (which can also be referred to as the Tx admittance in some embodiments, for brevity). Please note that, in some embodiments, the admittance-related index corresponding to the ratio of the driving current $I_{DRV}$ to the driving voltage $V_{DRV}$ can be referred to as the current deviation, for better comprehension.

In addition, regarding the admittance-related index mentioned above, in a situation where the admittance-related index corresponds to the reciprocal of the ratio of the driving current $I_{DRV}$ to the driving voltage $V_{DRV}$, the apparatus 100 may determine the received power of the aforementioned at least one wireless charging receiver according to the aforementioned at least one received power report obtained from the aforementioned at least one wireless charging receiver, and may determine a normalized transmitter impedance parameter (which can also be referred to as the normalized Tx impedance, for brevity) corresponding to the received power of the aforementioned at least one wireless charging receiver according to a predetermined relationship between the normalized transmitter impedance parameter and the received power of the aforementioned at least one wireless charging receiver. For example, the predetermined relationship between the normalized transmitter impedance parameter and the received power of the aforementioned at least one wireless charging receiver may be obtained from a database such as that mentioned above (or another LUT in the wireless charging transmitter 210) within the wireless charging transmitter 210. In addition, a specific index generating circuit within the set of index generating circuits (e.g. an index generating circuit within the M index generating circuits 122-1, 122-2, . . . , and 122-M, such as the index generating circuit 122-3) may calculate a difference between the reciprocal of the ratio of the driving current $I_{DRV}$ to the driving voltage $V_{DRV}$ and the normalized transmitter impedance parameter mentioned above to generate the admittance-related index, where the reciprocal of the driving current $I_{DRV}$ to the driving voltage $V_{DRV}$ (i.e. the ratio of the driving voltage $V_{DRV}$ to the driving current $I_{DRV}$) can be referred to as the transmitter impedance (which can also be referred to as the Tx impedance in some embodiments, for brevity). Please note that, in some embodiments, the admittance-related index corresponding to the reciprocal of the ratio of the driving current $I_{DRV}$ to the driving voltage $V_{DRV}$ can be referred to as the impedance deviation, for better comprehension.

Regarding the current-related index mentioned above, please note that the current-related index is different from the admittance-related index. The apparatus 100 may determine the received power of the aforementioned at least one wireless charging receiver according to the aforementioned at least one received power report obtained from the aforementioned at least one wireless charging receiver, and may determine a normalized transmitter current parameter (which can also be referred to as the normalized Tx current, for brevity) corresponding to the received power of the aforementioned at least one wireless charging receiver according to a predetermined relationship between the normalized transmitter current parameter and the received power of the aforementioned at least one wireless charging receiver. For example, the predetermined relationship between the normalized transmitter current parameter and the received power of the aforementioned at least one wireless charging receiver may be obtained from a database such as that mentioned above (or another LUT in the wireless charging transmitter 210) within the wireless charging transmitter 210. In addition, a specific index generating circuit within the set of index generating circuits (e.g. an index generating circuit within the M index generating circuits 122-1, 122-2, . . . , and 122-M, such as the index generating circuit 122-2) may calculate a difference between the driving current $I_{DRV}$ and the normalized transmitter current parameter mentioned above to generate the current-related index, where the driving current $I_{DRV}$ can be referred to as the transmitter current (which can also be referred to as the Tx current in some embodiments, for brevity). Please note that, in some embodiments, the current-related index can be referred to as the current deviation, for better comprehension.

According to some embodiments, the apparatus 100 may generate a warning control signal according to at least one portion of comparison results within the set of comparison results mentioned above, where the warning control signal is utilized for controlling a warning user interface (UI) of the wireless charging transmitter 210 to indicate whether a foreign object is a dangerous foreign object or a non-dangerous foreign object. Examples of the warning UI mentioned above may include, but not limited to, at least one light emitting diode (LED) (e.g. one or more LEDs), where the aforementioned at least one LED can be referred to as the warning LED.

According to some embodiments, the set of FOD strategy control parameters mentioned above may comprise a received power parameter, where the received power parameter corresponds to the received power of the aforementioned at least one wireless charging receiver. More particularly, the set of FOD strategy control parameters may further comprise a wireless charging receiver count parameter, where the wireless charging receiver count parameter represents the number of wireless charging receivers within the aforementioned at least one wireless charging receiver. For example, the set of FOD strategy control parameters may further comprise at least one device type parameter, where the aforementioned at least one device type parameter corresponds to a transmitter type (which can be referred to as Tx type in some embodiments, for brevity) of the wireless charging transmitter 210 or at least one receiver type (which can be referred to as Rx type in some embodiments, for brevity) of the aforementioned at least one wireless charging receiver (e.g. a receiver type of the wireless charging receiver 220).

According to some embodiments, a specific wireless charging receiver within the aforementioned at least one wireless charging receiver may determine at least one random value for controlling timing of packet transmission regarding at least one wireless charging report of the specific wireless charging receiver. In addition, based on the aforementioned at least one random value, the specific wireless charging receiver may send at least one random phase-delay packet, where each random phase-delay packet of the aforementioned at least one random phase-delay packet may have a random phase-delay with respect to a time slot of a series of time slots along the time axis, and the aforementioned at least one random phase-delay packet can be utilized for carrying information of the aforementioned at least one wireless charging report. Additionally, the apparatus 100 may accumulate packet information of a plurality of packets (e.g. a plurality of received power report packets such as that mentioned above) in a predefined period to generate an accumulation value, where the plurality of packets comprises the aforementioned at least one random phase-delay packet sent by the specific wireless charging receiver, and the length of the predefined period is greater than or equal to twice the length of the time slot. Further, the apparatus 100 may determine the wireless charging receiver count parameter mentioned above according to the accumulation value. More particularly, the apparatus 100 may perform at least one filtering operation on the accumulation value to generate the wireless charging receiver count parameter.

According to some embodiments, the apparatus 100 may access a FOD control database that is prepared in advance. In addition, the FOD control database may indicate at least one predetermined zone, such as a FOD zone, on a coordinate plane of (Rx_power, Tx_admittance), in which the coordinate Rx_power may represent the received power of the aforementioned at least one wireless charging receiver and the coordinate Tx_admittance may represent the ratio of the driving current $I_{DRV}$ to the driving voltage $V_{DRV}$, and the aforementioned at least one predetermined zone may correspond to dangerous foreign objects or non-dangerous foreign objects. Additionally, based on the FOD control database, the apparatus 100 may determine whether to temporarily stop wireless charging or not according to the received power of the aforementioned at least one wireless charging receiver and the ratio of the driving current $I_{DRV}$ to the driving voltage $V_{DRV}$.

In practice, the FOD control database and the aforementioned database can be integrated into the same database. This is for illustrative purposes only, and is not meant to be a limitation of the present invention. In some examples, the FOD control database and the aforementioned database can be implemented as individual databases, respectively.

In addition, the aforementioned at least one predetermined zone may be associated with one or more adjustable thresholds to be utilized by the FOD strategy module 130, for example. This is for illustrative purposes only, and is not meant to be a limitation of the present invention. In some examples, it is unnecessary that the aforementioned at least one predetermined zone are associated with one or more adjustable thresholds to be utilized by the FOD strategy module 130.

According to some embodiments, the set of indexes mentioned in Step 320 may be generated in a steady state regarding the wireless charging operation performed by the wireless charging transmitter 210. In addition, the apparatus 100 may perform at least one steady state detection within the wireless charging transmitter 210 to guarantee that the set of indexes is generated in the steady state.

According to some embodiments, the apparatus 100 may generate another set of indexes at least according to the driving current $I_{DRV}$ and the driving voltage $V_{DRV}$, where the other set of indexes may comprise a current index indicating the driving current $I_{DRV}$, and may further comprise an admittance index indicating the ratio of the driving current $I_{DRV}$ to the driving voltage $V_{DRV}$. For better comprehension, the current index mentioned above can also be referred to as the Tx current, and the admittance index can also be referred to as the Tx admittance. In addition, the apparatus 100 may perform the wireless charging FOD according to the set of indexes and according to the other set of indexes. For example, when the other set of indexes indicates that a dangerous foreign object is detected, the apparatus 100 (more particularly, the FOD strategy module 130 therein) may immediately stop wireless charging, and may temporarily prevent utilizing the set of indexes. Therefore, with aid of the other set of indexes the apparatus 100 may perform emergency state FOD, where the set of indexes can be temporarily ignored in an emergency state of the wireless power transfer system 200 (or an emergency state of the wireless charging transmitter 210).

Figure 4:
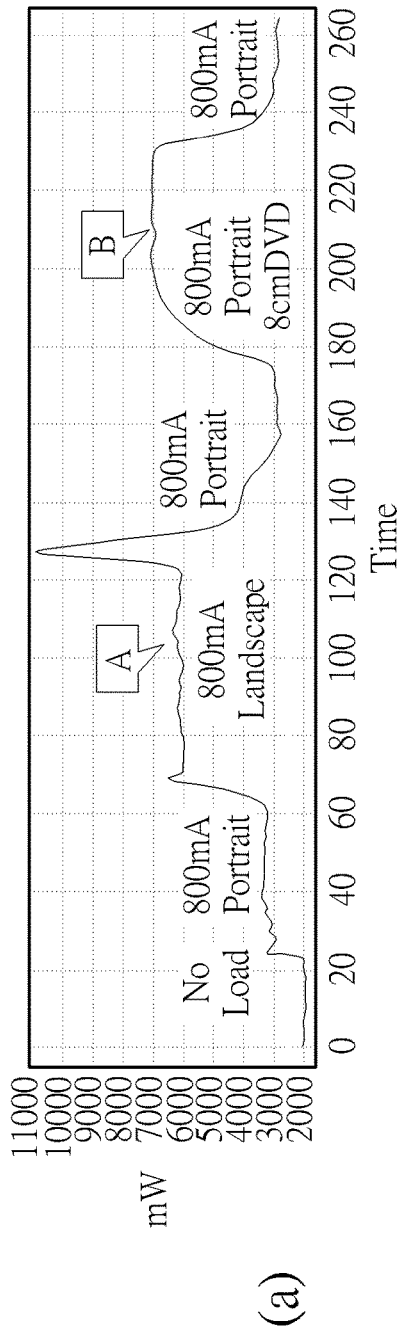
FIG. 4 illustrates a multi-index control scheme involved with the method shown in FIG. 3 according to an embodiment of the present invention.
Figure 4:
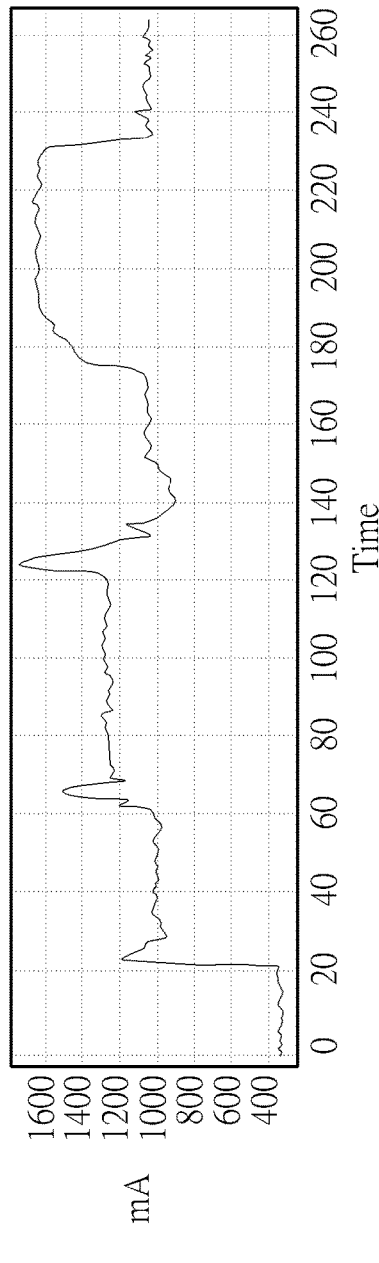
Figure 4:
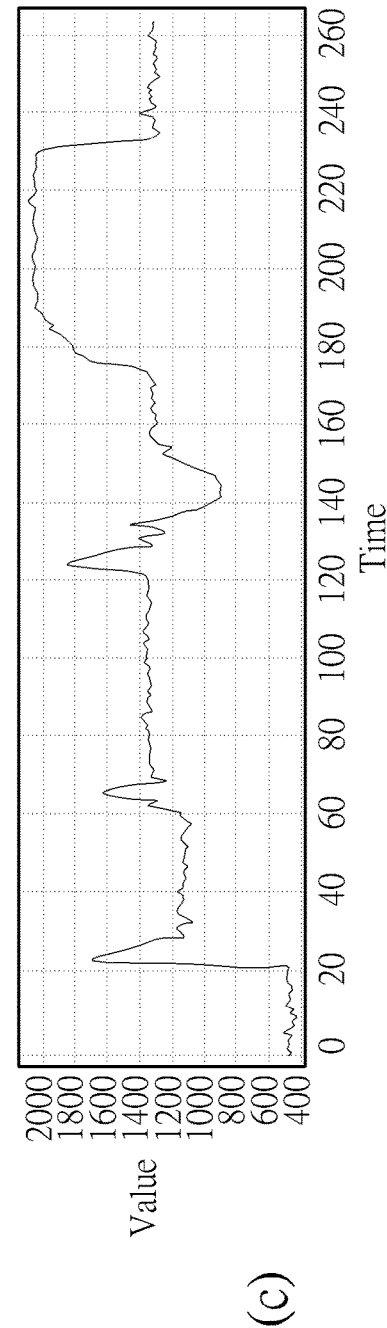

FIG. 4 illustrates a multi-index control scheme involved with the method 300 shown in FIG. 3 according to an embodiment of the present invention. The curve in the sub-diagram (a) of FIG. 4 may indicate the power loss index (which can be referred to as the power loss in this embodiment, for brevity) that varies with respect to time. In addition, the curve in the sub-diagram (b) of FIG. 4 may indicate the current-related index (which can be referred to as the current deviation in this embodiment, for better comprehension) that varies with respect to time. Additionally, the curve in the sub-diagram (c) of FIG. 4 may indicate the admittance-related index (which can be referred to as the admittance deviation in this embodiment, for better comprehension) that varies with respect to time, where the admittance-related index of this embodiment corresponds to the ratio of the driving current $I_{DRV}$ to the driving voltage $V_{DRV}$.

For example, the time expressed by the horizontal axis of each sub-diagram within the sub-diagrams (a), (b), and (c) of FIG. 4 can be measured in unit of second (sec), and the index values of the index expressed by the vertical axis of each sub-diagram within the sub-diagrams (a), (b), and (c) of FIG. 4 may have been scaled up or scaled down (e.g. by utilizing an associated amplifier in the corresponding index generating circuit for generating this index within the index generating module 120), in order to prevent this index from being unusable and/or prevent this index from being truncated. This is for illustrative purposes only, and is not meant to be a limitation of the present invention. In some examples, the unit of the time expressed by the horizontal axis of each sub-diagram within the sub-diagrams (a), (b), and (c) of FIG. 4 may vary. In some examples, it is unnecessary to process at least one index (e.g. one or more indexes) within the set of indexes by scaling (e.g. scaling up or scaling down).

According to this embodiment, one or more of the wireless charging receiver 220 and a Digital Versatile Disc (DVD) having the size of 8 centimeters (cm), such as the aforementioned DVD having the size of 8 cm, can be selectively put onto the wireless charging transmitter 210 at different time points. At first, there is no load of wireless charging (labeled "No load" in the sub-diagram (a) of FIG. 4, for brevity) and both of the wireless charging receiver 220 and this DVD are not put onto the wireless charging transmitter 210, and then the wireless charging receiver 220 is put onto the wireless charging transmitter 210 in the portrait orientation, where a maximum coupling inbetween Rx and Tx is generated, with a charging current of 800 milliamperes (mA) (labeled "800 mA Portrait" in the sub-diagram (a) of FIG. 4, for brevity), causing the curve shown in the sub-diagram (a) of FIG. 4 to rise and switch to a higher level. Afterward, the wireless charging receiver 220 is put on the wireless charging transmitter 210 in the landscape orientation, where a minimum coupling inbetween Rx and Tx is generated, with the same charging current of 800 mA (labeled "800 mA Landscape" in the sub-diagram (a) of FIG. 4, for brevity), causing the curve shown in the sub-diagram (a) of FIG. 4 to rise again and switch to a higher level. This curve may further rise for a certain reason, such as a wireless charging strategy of the apparatus 100. In addition, the wireless charging receiver 220 is put on the wireless charging transmitter 210 in the portrait orientation with the same charging current of 800 mA again (labeled "800 mA Portrait" in the sub-diagram (a) of FIG. 4, for brevity), causing the curve shown in the sub-diagram (a) of FIG. 4 to switch back to a lower level that is similar to the level between 30 sec and 60 sec. Later, the DVD may be put nearby, so both of the wireless charging receiver 220 and this DVD are put onto the wireless charging transmitter 210 (labeled "800 mA Portrait 8 cm DVD" in the sub-diagram (a) of FIG. 4, for brevity), causing the curve shown in the sub-diagram (a) of FIG. 4 to rise and switch to another higher level. At last, the DVD is removed, causing the curve shown in the sub-diagram (a) of FIG. 4 to switchback to a lower level that is similar to the level between 30 sec and 60 sec.

Although there is only a slight difference between the power loss in the situation A where the wireless charging receiver 220 is wirelessly charged in the landscape orientation and the power loss in the situation B where the wireless charging receiver 220 is wirelessly charged in the portrait orientation and the DVD is positioned nearby (e.g. as shown in the sub-diagram (a) of FIG. 4, the level of the partial curve corresponding to the situation B and the level of the partial curve corresponding to the situation A are close to each other along the vertical axis), the curve shown the sub-diagram (b) of FIG. 4 indicates that the current deviation can be utilized for distinguishing the situation B from the situation A or distinguishing the situation A from the situation B, and the curve shown the sub-diagram (c) of FIG. 4 indicates that the admittance deviation can be utilized for distinguishing the situation B from the situation A or distinguishing the situation A from the situation B. For example, as shown in the sub-diagram (b) of FIG. 4, the level of the partial curve corresponding to the situation B and the level of the partial curve corresponding to the situation A are surely separated from each other along the vertical axis, and therefore the apparatus 100 (more particularly, the FOD strategy module 130) is capable of distinguishing the situation B from the situation A and is capable of distinguishing the situation A from the situation B according to the current-related index mentioned above, without being hindered by the fluctuations of the curve shown in the sub-diagram (b) of FIG. 4. In another example, as shown in the sub-diagram (c) of FIG. 4, the level of the partial curve corresponding to the situation B and the level of the partial curve corresponding to the situation A are surely separated from each other along the vertical axis, and therefore the apparatus 100 (more particularly, the FOD strategy module 130) is capable of distinguishing the situation B from the situation A and is capable of distinguishing the situation A from the situation B according to the admittance-related index mentioned above, without being hindered by the fluctuations of the curve shown in the sub-diagram (c) of FIG. 4.

Therefore, based on the multi-index control scheme shown in FIG. 4, the method 300 and the associated apparatus 100 can accurately determine whether a foreign object is detected regardless of the coupling variation due to different Rx position, and therefore the related art problems such as the aforementioned false alarm or the aforementioned detection failure can be prevented. More particularly, in a situation where the wireless charging transmitter is a resonant wireless charging transmitter, the method 300 and the associated apparatus 100 can properly perform FOD (more particularly, the wireless charging FOD mentioned in Step 330) with aid of admittance detection and/or impedance detection.

Figure 5:
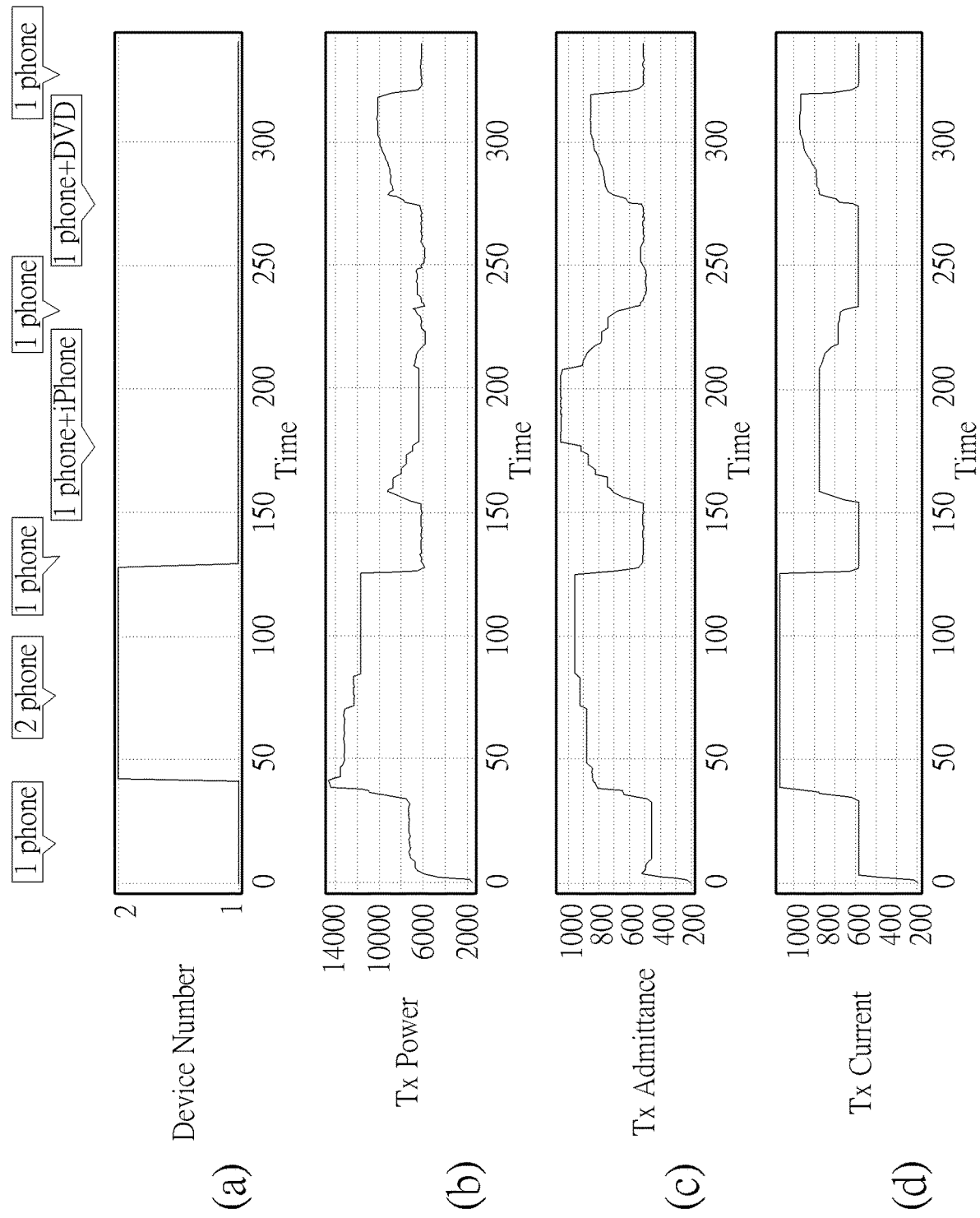
FIG. 5 illustrates a multi-index control scheme involved with the method shown in FIG. 3 according to another embodiment of the present invention.

FIG. 5 illustrates a multi-index control scheme involved with the method 300 shown in FIG. 3 according to another embodiment of the present invention. The curve in the sub-diagram (a) of FIG. 5 may indicate the wireless charging receiver count parameter (which can be referred to as the device number or the Rx number in this embodiment, for brevity) that varies with respect to time. Please note that the wireless charging receiver count parameter represents the number of wireless charging receivers within the aforementioned at least one wireless charging receiver. In addition, the curve in the sub-diagram (b) of FIG. 5 may indicate the transmitter power (which can be referred to as the Tx power in this embodiment, for brevity) that varies with respect to time. Additionally, the curve in the sub-diagram (c) of FIG. 5 may indicate the transmitter admittance (which can be referred to as the Tx admittance in this embodiment, for brevity) that varies with respect to time, where the admittance-related index of this embodiment corresponds to the ratio of the driving current $I_{DRV}$ to the driving voltage $V_{DRV}$. Further, the curve in the sub-diagram (d) of FIG. 5 may indicate the transmitter current (which can be referred to as the Tx current in this embodiment, for brevity) that varies with respect to time.

For example, the time expressed by the horizontal axis of each sub-diagram within the sub-diagrams (a), (b), (c), and (d) of FIG. 5 can be measured in unit of second (sec), and the data values of the data expressed by the vertical axis of each sub-diagram within the sub-diagrams (b), (c), and (d) of FIG. 5 may have been scaled up or scaled down (e.g. by utilizing an associated calculation unit in the corresponding calculation circuit for preparing the data used for generating the corresponding index within the index generating module 120), in order to prevent the data from being unusable and/or prevent the data from being truncated. This is for illustrative purposes only, and is not meant to be a limitation of the present invention. In some examples, the unit of the time expressed by the horizontal axis of each sub-diagram within the sub-diagrams (a), (b), (c), and (d) of FIG. 5 may vary. In some examples, it is unnecessary to process at least one portion (e.g. a portion or all) of the data (e.g. the data used for generating the corresponding index) by scaling (e.g. scaling up or scaling down).

According to this embodiment, one or more of the wireless charging receiver 220, another wireless charging receiver such as a copy of the wireless charging receiver 220, a DVD such as that mentioned above, and a non-compatible electronic device (labeled "iPhone" in FIG. 5, for example) that is not designed for the wireless charging transmitter 210 can be selectively put onto the wireless charging transmitter 210 at different time points. At first, there is no load of wireless charging (e.g. at the time of 0 sec) and none of the wireless charging receiver 220, the other wireless charging receiver, the DVD, and the non-compatible electronic device are not put onto the wireless charging transmitter 210. Then, the wireless charging receiver 220 is put onto the wireless charging transmitter 210 (labeled "1 phone" in the sub-diagram (a) of FIG. 5, for better comprehension), causing the curve shown in any sub-diagram within the sub-diagrams (a), (b), (c), and (d) of FIG. 5, such as the curve shown in a specific sub-diagram within the sub-diagrams (a), (b), (c), and (d) of FIG. 5, to rise and switch to a higher level. Afterward, both of the wireless charging receiver 220 and the other wireless charging receiver (e.g. the copy of the wireless charging receiver 220) are put on the wireless charging transmitter 210 (labeled "2 phone" in the sub-diagram (a) of FIG. 5, for better comprehension), causing the curve shown in any sub-diagram within the sub-diagrams (a), (b), (c), and (d) of FIG. 5, such as the curve shown in the specific sub-diagram mentioned above, to rise again and switch to another higher level. In addition, the other wireless charging receiver is removed and only the wireless charging receiver 220 is put on the wireless charging transmitter 210 (labeled "1 phone" in the sub-diagram (a) of FIG. 5, for better comprehension), causing the curve shown in any sub-diagram within the sub-diagrams (a), (b), (c), and (d) of FIG. 5, such as the curve shown in the specific sub-diagram mentioned above, to switch back to a lower level that is similar to the level between 20 sec and 30 sec. Later, both of the wireless charging receiver 220 and the non-compatible electronic device are put on the wireless charging transmitter 210 (labeled "1 phone+iPhone" in the sub-diagram (a) of FIG. 5, for better comprehension), causing the curve shown in any sub-diagram within the sub-diagrams (b), (c), and (d) of FIG. 5 to vary as shown in FIG. 5. Afterward, the non-compatible electronic device is removed and only the wireless charging receiver 220 is put on the wireless charging transmitter 210 (labeled "1 phone" in the sub-diagram (a) of FIG. 5, for better comprehension), causing the curve shown in any sub-diagram within the sub-diagrams (b), (c), and (d) of FIG. 5 to vary as shown in FIG. 5. Additionally, the DVD may be put nearby, so both of the wireless charging receiver 220 and this DVD are put onto the wireless charging transmitter 210 (labeled "1 phone+DVD" in the sub-diagram (a) of FIG. 5, for better comprehension), causing the curve shown in any sub-diagram within the sub-diagrams (b), (c), and (d) of FIG. 5 to vary as shown in FIG. 5. At last, the DVD is removed, causing the curve shown in any sub-diagram within the sub-diagrams (b), (c), and (d) of FIG. 5 to vary as shown in FIG. 5.

Please note that, in this embodiment, a dangerous foreign object such as the DVD may induce larger power loss than that of a non-dangerous foreign object such as the non-compatible electronic device. In addition, the dangerous foreign object such as the DVD may cause the transmitter admittance (or the Tx transmittance) to become greater, and the non-dangerous foreign object such as the non-compatible electronic device may cause the transmitter admittance (or the Tx transmittance) to become much greater, where the apparatus 100 (more particularly, the FOD strategy module 130) is capable of distinguishing one situation within the situations respectively labeled "1 phone", "1 phone+iPhone", and "1 phone+DVD" in FIG. 5 from another situation within the situations respectively labeled "1 phone", "1 phone+iPhone", and "1 phone+DVD" in FIG. 5 according to the transmitter transmittance, without being hindered by the fluctuations of the curve shown in the sub-diagram (c) of FIG. 5. Thus, according to the detected data such as that indicated by the curves shown in FIG. 5, the apparatus 100 (more particularly, the FOD strategy module 130) can control the wireless charging transmitter 210 to selectively stop wireless charging when needed. In a situation where the foreign objects that will not get heated, such as the non-compatible electronic device in this example, are put nearby, the wireless charging receiver 220 can still be wirelessly charged if the power loss is within a predefined range and the transmitter admittance (or the Tx admittance) falls within the range of an interval corresponding to a predetermined zone that is defined in advance, such as a specific predetermined zone within the aforementioned at least one predetermined zone.

Therefore, based on the multi-index control scheme shown in FIG. 5, the method 300 and the apparatus 100 can accurately determine whether a foreign object is detected, and can accurately determine whether a foreign object is a dangerous foreign object or a non-dangerous foreign object, and therefore the related art problems such as the aforementioned false alarm or the aforementioned detection failure can be prevented. More particularly, in a situation where the wireless charging transmitter is a resonant wireless charging transmitter, the present invention method and the associated apparatus can properly perform FOD (more particularly, the wireless charging FOD mentioned in Step 330) with aid of admittance detection and/or impedance detection, and can temporarily stop a wireless charging procedure when needed, and therefore can prevent dangerous foreign objects from making fire during the wireless charging procedure and can prevent non-dangerous foreign objects from interrupting the wireless charging procedure. As a result, both of the performance of the wireless charging transmitter and the safety of the user of the wireless charging transmitter can be guaranteed.

Figure 6:
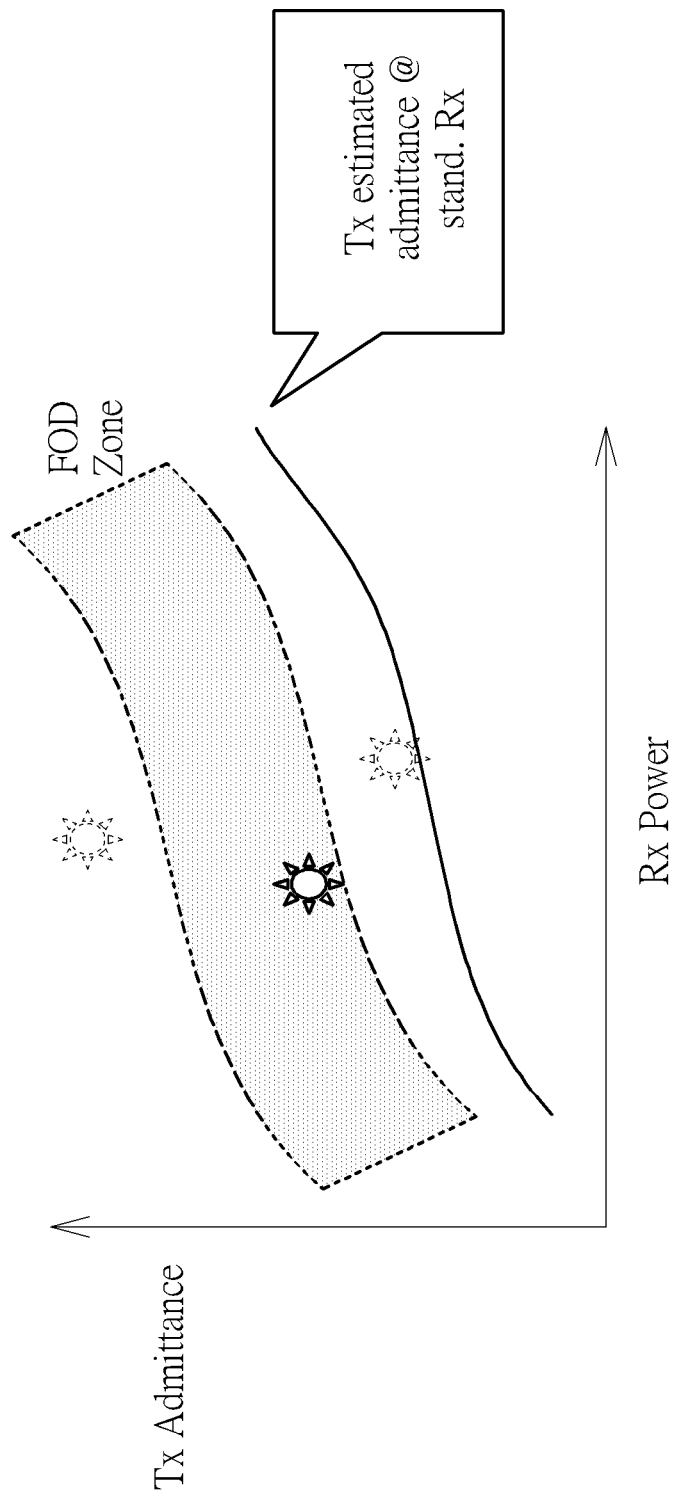
FIG. 6 illustrates a foreign object detection (FOD) zone involved with the method shown in FIG. 3 according to an embodiment of the present invention.

FIG. 6 illustrates a FOD zone involved with the method 300 shown in FIG. 3 according to an embodiment of the present invention, where the FOD zone shown in FIG. 6 can be taken as an example of the specific predetermined zone mentioned above. For example, the coordinate plane of (Rx_power, Tx_admittance) mentioned in some embodiments described between the embodiment shown in FIG. 3 and the embodiment shown in FIG. 4 can be illustrated as the coordinate plane of (Rx power, Tx admittance) shown in FIG. 6. In addition, the Rx power expressed by the horizontal axis of FIG. 6 may represent the receiver power of the aforementioned at least one wireless charging receiver, and the Tx admittance expressed by the vertical axis of FIG. 6 may represent the transmitter admittance mentioned above, i.e. the ratio of the driving current $I_{DRV}$ to the driving voltage $V_{DRV}$.

In practice, a specific curve on the coordinate plane of (Rx_power, Tx_admittance), such as the curve labeled "Tx estimated admittance @ stand. Rx", can be prepared in advance according to some experiments, for being utilized as the reference for generating the FOD zone, where the curve labeled "Tx estimated admittance @ stand. Rx" can be generated by estimating the Tx admittance with respect to the Rx power while the wireless charging receiver 220 is set at a standard mode (labeled "stand." in FIG. 6, for brevity).

Please note that the FOD zone indicated by the aforementioned FOD control database that is prepared in advance can be utilized for indicating whether a foreign object is a dangerous foreign object or a non-dangerous foreign object. When the received power of the aforementioned at least one wireless charging receiver (i.e. the Rx power) is just determined according to the aforementioned at least one received power report obtained from the aforementioned at least one wireless charging receiver (e.g. the aforementioned received power report obtained from the wireless charging receiver 220), based on the aforementioned FOD control database that is prepared in advance, the apparatus 100 may determine, for example, two adjustable thresholds TH1 and TH2 by calculating the intersections of the boundary of the FOD zone and a specific straight line corresponding to the received power that is just determined, in an online manner. After the two adjustable thresholds TH1 and TH2 are determined in the online manner (e.g. in a situation where TH1<TH2), the apparatus 100 (more particularly, the FOD strategy module 130 therein) may determine whether a foreign object is a dangerous foreign object or a non-dangerous foreign object according to whether the latest detection value of the Tx admittance falls within the range of the interval [TH1, TH2]. For example, when it is detected that the latest detection value of the Tx admittance falls within the range of the interval [TH1, TH2], the apparatus 100 (more particularly, the FOD strategy module 130 therein) may determine this foreign object to be a non-dangerous foreign object; otherwise, the apparatus 100 (more particularly, the FOD strategy module 130 therein) may determine this foreign object to be a dangerous foreign object. As a result, he apparatus 100 (more particularly, the FOD strategy module 130 therein) may determine whether to temporarily stop wireless charging or not according to whether this foreign object is a dangerous foreign object. For example, when it is detected that this foreign object is a dangerous foreign object, the apparatus 100 (more particularly, the FOD strategy module 130 therein) controls the wireless charging transmitter 210 to temporarily stop wireless charging. In another example, when it is detected that this foreign object is a non-dangerous foreign object, the apparatus 100 (more particularly, the FOD strategy module 130 therein) may control a warning UI such as that mentioned above to indicate that this foreign object is a non-dangerous foreign object.

According to some embodiments, the apparatus 100 may use multiple sets of tables (more particularly, multiple sets of LUTs such as the LUTs mentioned above) respectively associated with variant types of thresholds. For example, the tables may correspond to different values of power loss, Tx current, Tx admittance, Tx type, Rx type, etc., respectively.

Figure 7:
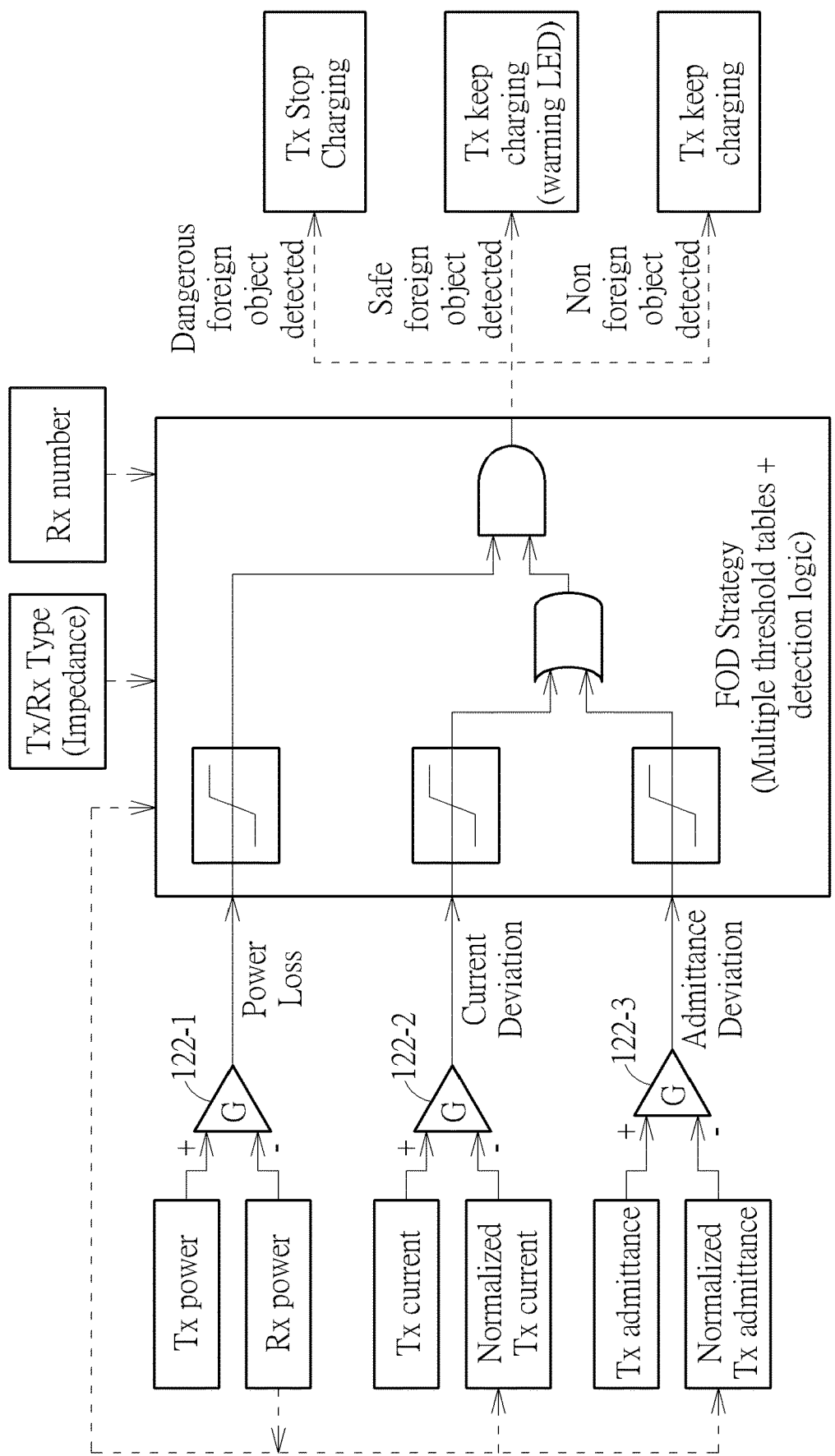
FIG. 7 illustrates a FOD strategy control scheme involved with the method shown in FIG. 3 according to an embodiment of the present invention.

FIG. 7 illustrates a FOD strategy control scheme involved with the method 300 shown in FIG. 3 according to an embodiment of the present invention. As shown in FIG. 7, the index generating circuit 122-1 may comprise an amplifier (labeled "G" in FIG. 7, for brevity) arranged for generating the aforementioned power loss index (labeled "Power Loss" in FIG. 7, for brevity), where a gain may be applied to the power loss index to process it by scaling (e.g. scaling up or scaling down), in order to achieve a better dynamic range while the power loss index is utilized by the FOD strategy module 130 (labeled "FOD Strategy" in FIG. 7, for brevity). In addition, the index generating circuit 122-2 may comprise an amplifier (labeled "G" in FIG. 7, for brevity) arranged for generating the aforementioned admittance-related index (labeled "Admittance Deviation" in FIG. 7, for brevity), and more particularly, the aforementioned admittance-related index corresponding to the ratio of the driving current $I_{DRV}$ to the driving voltage $V_{DRV}$, where another gain may be applied to the admittance-related index to process it by scaling (e.g. scaling up or scaling down), in order to achieve a better dynamic range while the admittance-related index is utilized by the FOD strategy module 130. Additionally, the index generating circuit 122-3 may comprise an amplifier (labeled "G" in FIG. 7, for brevity) arranged for generating the aforementioned current-related index (labeled "Current Deviation" in FIG. 7, for brevity), where another gain may be applied to the current-related index to process it by scaling (e.g. scaling up or scaling down), in order to achieve a better dynamic range while the current-related index is utilized by the FOD strategy module 130.

As shown in FIG. 7, the set of FOD strategy control parameters mentioned above may comprise the aforementioned wireless charging receiver count parameter (which can be referred to as the device number or the Rx number in this embodiment, for brevity), and may further comprise the aforementioned at least one device type parameter, such as a transmitter type parameter indicating the aforementioned transmitter type (which can be referred to as the Tx type in this embodiment, for brevity) and a receiver type parameter indicating the aforementioned receiver type (which can be referred to as the Rx type in this embodiment, for brevity). For example, the aforementioned transmitter type can be a specific class of different classes of transmitters, and the aforementioned receiver type can be a specific class of different classes of receivers, where a portion of classes within the aforementioned different classes of receivers may correspond to different values of receiver impedance (or Rx impedance). In another example, the aforementioned transmitter type can be a specific category of different categories of transmitters, and the aforementioned receiver type can be a specific category of different categories of receivers, where a portion of categories within the aforementioned different categories of receivers may correspond to different values of receiver impedance (or Rx impedance). In addition, the set of FOD strategy control parameters mentioned above may further comprise the receiver power (which can also be referred to as the Rx power in this embodiment, for brevity). Additionally, the aforementioned at least one FOD strategy (e.g. one or more FOD strategies) of the FOD strategy module 130 may comprise utilizing multiple sets of LUTs corresponding to the set of indexes, and online selecting LUTs that are suitable for the set of indexes according to the set of FOD strategy control parameters mentioned above. As a result, the FOD strategy module 130 may determine the aforementioned set of threshold corresponding to the set of FOD strategy control parameters according to the predetermined relationship between the set of threshold and the set of FOD strategy control parameters, and may compare the set of indexes with the set of threshold to generate the set of comparison results mentioned above, respectively, and may further generate the aforementioned wireless charging control signal (e.g. the output of the FOD strategy module 130 shown in FIG. 1) according to the set of comparison results, for controlling whether to temporarily stop wireless charging or not. This is for illustrative purposes only, and is not meant to be a limitation of the present invention.

Please note that the FOD strategy module 130 may comprise a predetermined logic combination, and may utilize the predetermined logic combination to perform logic operations (e.g. one or more OR operations and/or one or more AND operations) according to the set of comparison results mentioned above, in order to generate the output of the FOD strategy module 130 shown in FIG. 1, where the predetermined logic combination may comprise at least one OR logic operation unit (e.g. one or more OR logic operation units) and/or at least one AND logic operation unit (e.g. one or more AND logic operation units), such as the OR logic operation unit and the AND logic operation unit shown in FIG. 7. For example, the predetermined logic combination can be implemented by hardware circuits, and the predetermined logic combination may comprise a predetermined combination of logic circuits. More particularly, the OR logic operation unit and the AND logic operation unit shown in FIG. 7 can be implemented with an OR logic gate and an AND logic gate, respectively. This is for illustrative purposes only, and is not meant to be a limitation of the present invention. In another example, the predetermined logic combination can be implemented by a portion of program codes within the aforementioned set of program codes running on the processing circuit mentioned above.

With aid of the predetermined logic combination and the online selected LUTs indicating the set of threshold mentioned above, the FOD strategy module 130 can accurately perform the wireless charging FOD mentioned in Step 330 and can properly generate the output of the FOD strategy module 130 shown in FIG. 1, to control the wireless charging transmitter 210 to action correctly (e.g. control the wireless charging transmitter 210 to stop wireless charging or continue wireless charging). For example, in a situation where a foreign object (more particularly, a dangerous foreign object) is detected, the FOD strategy module 130 may control the wireless charging transmitter 210 to stop wireless charging (labeled "Tx stop charging" in FIG. 7, for better comprehension). This is for illustrative purposes only, and is not meant to be a limitation of the present invention. Please note that the FOD strategy module 130 may further comprise another predetermined logic combination, and may utilize the other predetermined logic combination to perform logic operations (e.g. one or more OR operations and/or one or more AND operations) according to at least one portion (e.g. a portion or all) of the set of comparison results mentioned above, in order to generate another output of the FOD strategy module 130, where the other output of the FOD strategy module 130 can be utilized for controlling a warning UI such as that mentioned above (e.g. a warning LED such as that mentioned above). Thus, with aid of the aforementioned online selected LUTs indicating the set of threshold mentioned above and both of the predetermined logic combination and the other predetermined logic combination (labeled "Multiple threshold tables+detection logic" in FIG. 7, for better comprehension), the FOD strategy module 130 can accurately perform the wireless charging FOD mentioned in Step 330 and can properly generate the output of the FOD strategy module 130 shown in FIG. 1 and the other output of the FOD strategy module 130, to control the wireless charging transmitter 210 to action correctly (e.g. control the wireless charging transmitter 210 to stop wireless charging or continue wireless charging, and selective control the warning UI).

For example, in a situation where a dangerous foreign object is detected, the FOD strategy module 130 may control the wireless charging transmitter 210 to stop wireless charging (labeled "Tx stop charging" in FIG. 7, for better comprehension). In another example, in a situation where a safe foreign object (i.e. a non-dangerous foreign object) is detected, the FOD strategy module 130 may control the wireless charging transmitter 210 to keep wireless charging (labeled "Tx keep charging" in FIG. 7, for better comprehension), and may further control the warning UI (e.g. the warning LED) to indicate that this foreign object is a non-dangerous foreign object. In another example, in a situation where non-foreign object is detected (e.g. no foreign object is detected), the FOD strategy module 130 may control the wireless charging transmitter 210 to keep wireless charging (labeled "Tx keep charging" in FIG. 7, for better comprehension). For brevity, similar descriptions for this embodiment are not repeated in detail here.

Figure 8:
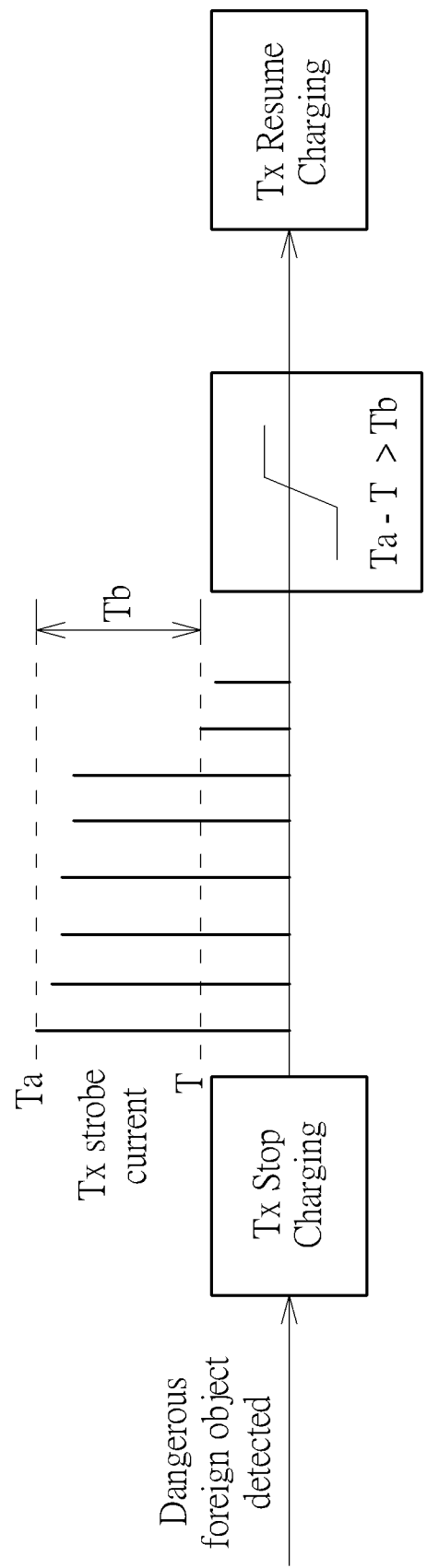
FIG. 8 illustrates a wireless charging recovery scheme involved with the method shown in FIG. 3 according to an embodiment of the present invention.

FIG. 8 illustrates a wireless charging recovery scheme involved with the method 300 shown in FIG. 3 according to an embodiment of the present invention. According to this embodiment, the apparatus 100 may compare an initial Tx current (more particularly, the current value Ta of the initial Tx current) that is stored in a memory thereof with the present Tx current (more particularly, the current value T of the present Tx current) to determine whether a foreign object has been removed.

As shown in FIG. 8, when the FOD state (e.g. a state indicating that a foreign object is detected) is trigged (or asserted), the apparatus 100 may control the wireless charging transmitter 210 to stop wireless charging, and more particularly, to stop charging by keeping the wireless charging transmitter 210 in a strobe mode. At this moment, the apparatus 100 may control the wireless charging transmitter 210 to output a series of strobe currents, such as the initial Tx current having the current value Ta and the present Tx current having the current value T. More particularly, when the FOD state is triggered (or asserted), the apparatus 100 may store the current value Ta of the initial Tx current in the memory. The current values of the series of strobe currents may decrease as time goes by. When it is detected that the difference between the current value Ta of the initial Tx current and the current value of one of the series of strobe currents, such as the current value T of the present Tx current, is greater than a predefined value Tb (e.g. Ta−T>Tb), which means the foreign object has been removed, the apparatus 100 may control the wireless charging transmitter 210 to resume charging (e.g. normal wireless charging).

Figure 9:
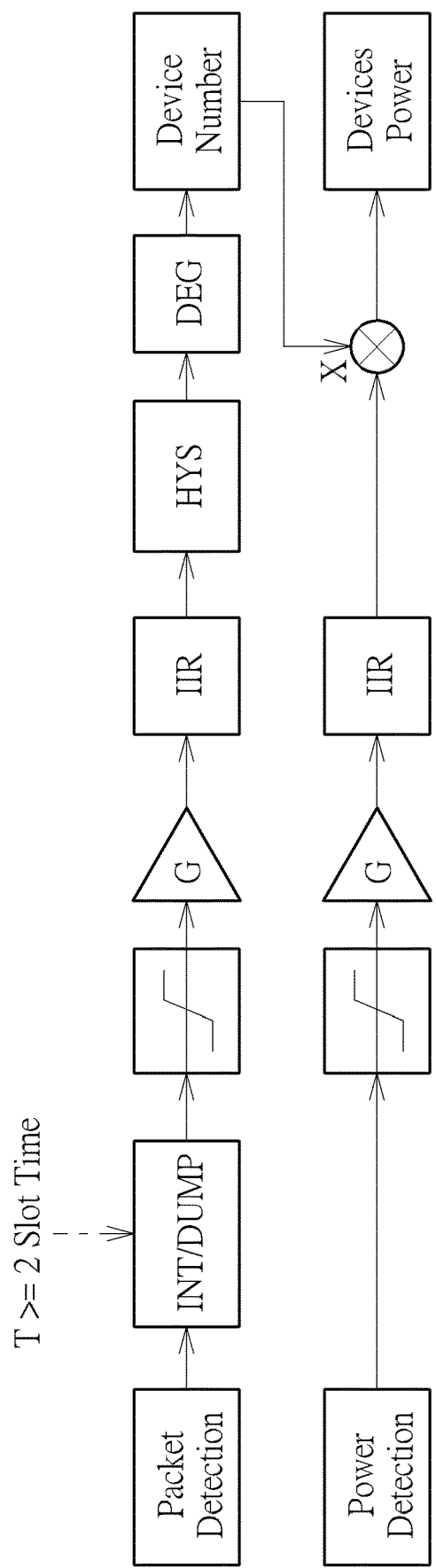
FIG. 9 illustrates a random mode device control scheme involved with the method shown in FIG. 3 according to an embodiment of the present invention.

FIG. 9 illustrates a random mode device control scheme involved with the method 300 shown in FIG. 3 according to an embodiment of the present invention. According to this embodiment, the apparatus 100 may determine the random mode device number, i.e. the device number of the wireless charging receivers that are operating in a random mode, such as the aforementioned specific wireless charging receiver that may send the aforementioned at least one random phase-delay packet. In the random mode, any of these wireless charging receivers may send random phase-delay packets such as the aforementioned at least one random phase-delay packet, and may perform in-band communications (which can be referred to as inband COMMs in some embodiments, for brevity). For some implementation details regarding the random mode, please refer to the U.S. Provisional Application No. 61/928,093, which was filed on Jan. 16, 2014.

For example, the packet information mentioned above can be accumulated in the aforementioned predefined period such as a predefined period T, which can be greater than or equal to twice the slot time in the random mode. That is, the predefined period T can be greater than or equal to twice the period of the periodical time slots utilized by any of these wireless charging receivers. More particularly, a packet detection module (labeled "Packet Detection" in FIG. 9, for brevity) within the wireless charging transmitter 210 may send a value, such as a logical value indicating that a random phase-delay packet is detected, into the upper path of the architecture shown in FIG. 9, to allow this value to be processed by (or allow this value to go through) some boundary protection units such as an initialization control and dump unit (labeled "INT/DUMP" in FIG. 9, for brevity) and a comparison unit (illustrated with a threshold detection function on the upper path of the architecture shown in FIG. 9, for example). In addition, the processing result from these boundary protection units can be sent into an amplifier (labeled "G" on the upper path of the architecture shown in FIG. 9, for brevity) for being processed by scaling (e.g. scaling up or scaling down), where the processing result from this amplifier can be filtered by an IIR low pass filter (labeled "IIR" on the upper path of the architecture shown in FIG. 9, for brevity), and further filed by a hysteresis unit and a deglitch unit (respectively labeled "HYS" and "DEG" on the upper path of the architecture shown in FIG. 9, for brevity), in order to determine an anticipated device number such as the device number mentioned above. Please note that the lower path of the architecture shown in FIG. 9 may comprise some components that are similar to some components on the upper path of the architecture shown in FIG. 9, such as another comparison unit, another amplifier, and another IIR low pass filter, where a power detection module (labeled "Power Detection" in FIG. 9, for brevity) within the wireless charging transmitter 210 may obtain the power information from the packet information such as that mentioned above (e.g. the power information carried by the aforementioned at least one random phase-delay packet, and more particularly, the power information carried by random phase-delay packets of these wireless charging receivers) to allow the power information to be processed by the other comparison unit, the other amplifier, and the other IIR low pass filter, in order to generate an average power value of all of these wireless charging receivers. As a result of the multiplying operation performed by the multiplying unit shown around the lower right corner of FIG. 9, such as the operation of multiplying the average power value by the device number, the architecture shown in FIG. 9 determines the total device power (labeled "Devices Power" in FIG. 9, for brevity), i.e. the total received power of these wireless charging receivers, where the total received power can be taken as an example of the received power of the aforementioned at least one wireless charging receiver, and can be taken as an example of the Rx power shown in FIG. 7.

Figure 10:
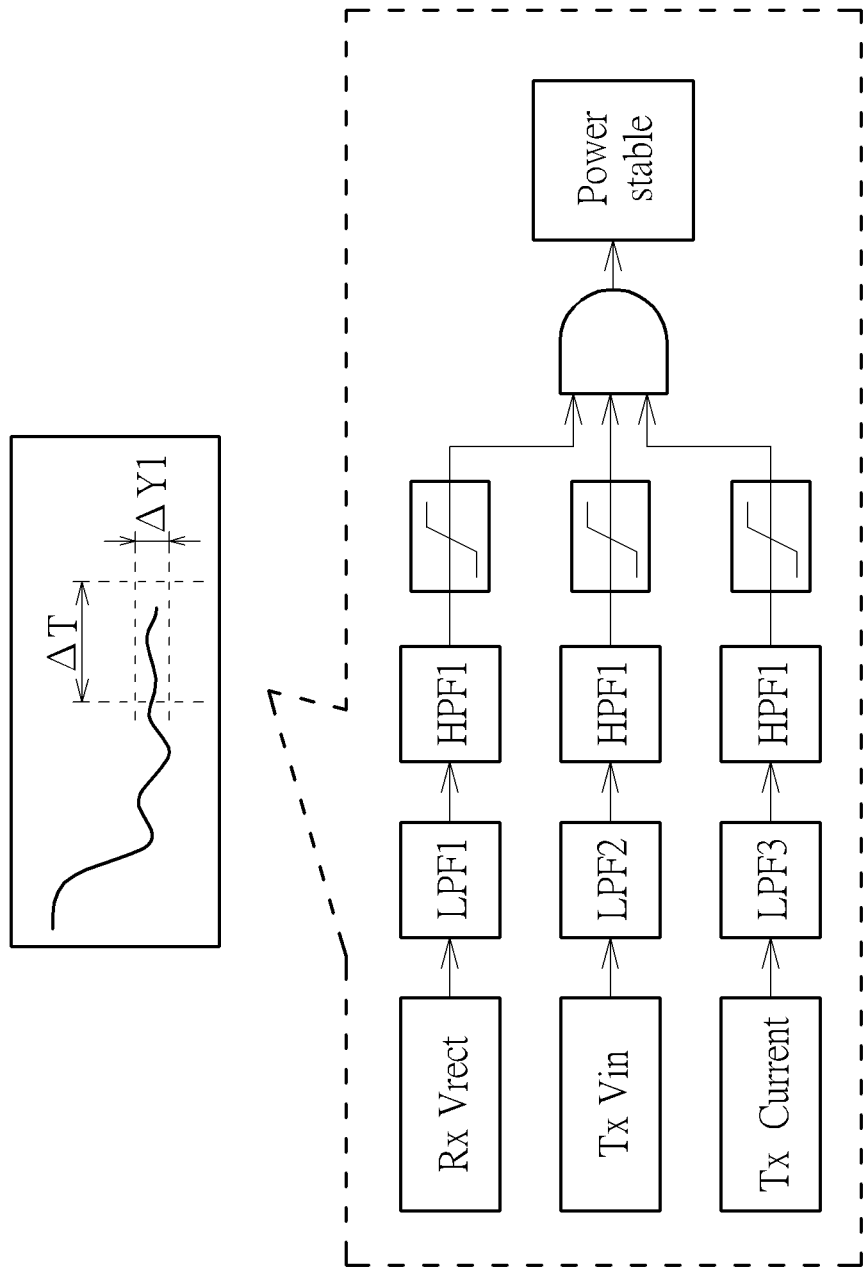
FIG. 10 illustrates a steady state control scheme involved with the method shown in FIG. 3 according to an embodiment of the present invention.

FIG. 10 illustrates a steady state control scheme involved with the method 300 shown in FIG. 3 according to an embodiment of the present invention. For achieving better performance of the wireless charging transmitter 210, the apparatus 100 may perform steady state detection to determine whether the wireless charging transmitter 210 is in a power transfer steady state. More particularly, some judgment operations regarding the aforementioned wireless charging FOD need to be performed in the power transfer steady state.

As shown in FIG. 10, multiple parameters of the wireless charging transmitter 210 and/or the aforementioned at least one wireless charging receiver, such as the rectified voltage Vrect of the wireless charging receiver 220, the transmitter driving voltage such as the driving voltage $V_{DRV}$, and the transmitter current (respectively labeled "Rx Vrect", "Tx Vin", and "Tx current" in FIG. 10, for brevity), can be monitored by the architecture shown in FIG. 10. For example, the architecture shown in FIG. 10 can be positioned within the wireless charging transmitter 210, and more particularly, can be positioned within the apparatus 100. In addition, each of these parameters can be filtered by a lower pass filter (LPF) for deglitching, and can be filtered by a high pass filter (HPF) for offset reduction or offset elimination, and can further be filtered by a comparison unit (illustrated with a threshold detection function on the corresponding path within the three paths of the architecture shown in FIG. 10, for example). For example, the rectified voltage Vrect of the wireless charging receiver 220 can be filtered by the LPF LPF1 and the HPF HPF1, the transmitter driving voltage can be filtered by the LPF LPF2 and the HPF HPF2, and the transmitter current can be filtered by the LPF LPF3 and the HPF HPF3. Additionally, all of these filtered results are sent to an AND logic operation unit (e.g. an AND logic gate, or an AND logic operation unit implemented by program code(s) running on the processing circuit mentioned above), and this AND logic operation unit performs an AND logic operation on these filtered results to generate a power stable index (labeled "Power Stable" in FIG. 10, for brevity) for indicating whether the wireless charging transmitter 210 is in the power transfer steady state. For example, as a result of applying the steady state control scheme shown in FIG. 10 to the apparatus 100, when the fluctuations of each of the outputs of the HPFs HPF1, HPF2, and HPF3 are within a predetermined range such as the predetermined range $\Delta Y1$ shown in FIG. 10 for a predetermined time period such as the predetermined time period $\Delta T$ shown in FIG. 10, each of these filtered results are at the TRUE state thereof (e.g. at the high level thereof), and therefore the AND logic operation unit outputs the TRUE state thereof (e.g. at the high level thereof), causing the power stable index to indicate that the wireless charging transmitter 210 is in the power transfer steady state.

Figure 11:
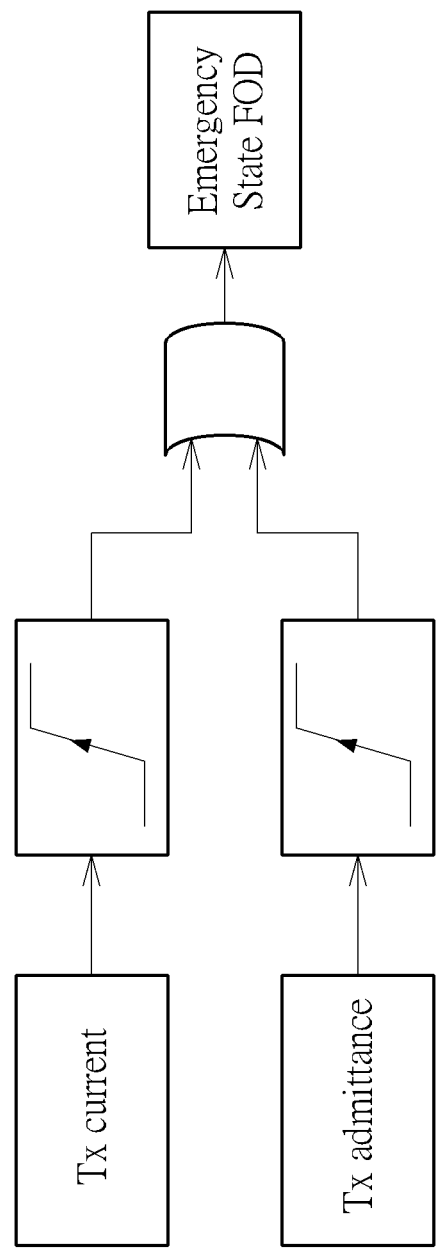
FIG. 11 illustrates an emergency protection control scheme involved with the method shown in FIG. 3 according to an embodiment of the present invention.

FIG. 11 illustrates an emergency protection control scheme involved with the method 300 shown in FIG. 3 according to an embodiment of the present invention. According to this embodiment, the apparatus 100 may perform emergent FOD according to the other set of indexes mentioned above, without being limited by any judgment within the FOD associated to the set of indexes mentioned above or by the steady state detection mentioned above. As shown in FIG. 11, each of the Tx current and Tx admittance can be monitored (or filtered) by utilizing a comparison unit (illustrated with a threshold detection function on the corresponding path within the two paths of the architecture shown in FIG. 11, for example). For example, when one or more of the Tx current and Tx admittance (e.g. Tx current, or Tx admittance, or both of the Tx current and Tx admittance) is at the TRUE state thereof (e.g. at the high level thereof), and the OR logic operation unit outputs the TRUE state thereof (e.g. at the high level thereof), causing the emergency state FOD index at the output of the architecture shown in FIG. 11 to indicate that the wireless charging transmitter 210 is in the emergency state. As a result, the wireless charging transmitter 210 may stop wireless charging when the Tx current reaches a first predetermined value or Tx admittance reach a second predetermined value, where each of the first predetermined value and the second predetermined value may correspond to Rx number shown in FIG. 7 (i.e. the device number mentioned above) and the Rx power shown in FIG. 7.

Figure 12:
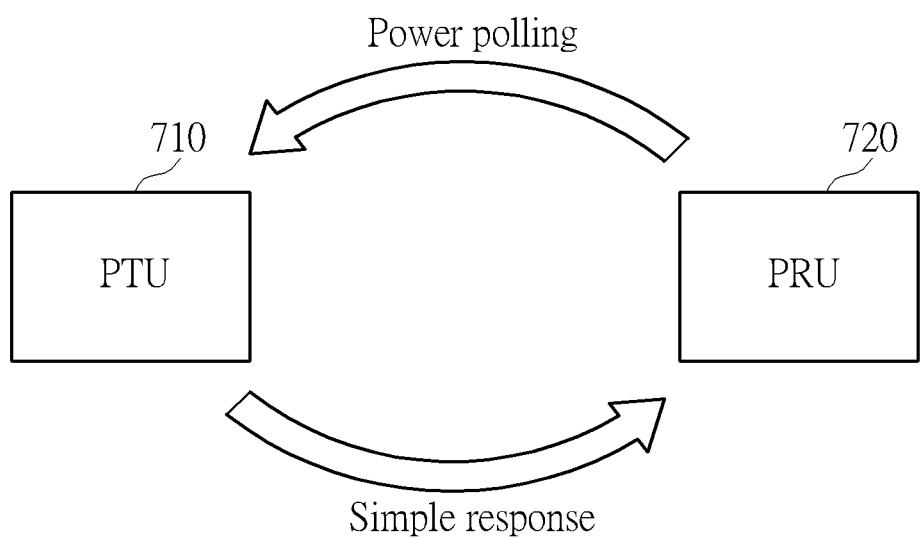
FIG. 12 illustrates a polling and simple-response control scheme involved with the method shown in FIG. 3 according to an embodiment of the present invention.

FIG. 12 illustrates a polling and simple-response control scheme involved with the method shown in FIG. 3 according to an embodiment of the present invention. The polling and simple-response control scheme may be applied to the transmitter Tx (e.g. the wireless charging transmitter 210) such as a power transmitting unit (PTU), and may be applied to the receiver Rx (e.g. the wireless charging receiver 220) such as a power receiving unit (PRU). For better comprehension, the PTU may be taken as an example of the transmitter Tx and the PRU may be taken as an example of the receiver Rx. This is for illustrative purposes only, and is not meant to be a limitation of the present invention. In some embodiments, the implementation of at least one of the transmitter Tx and the receiver Rx (e.g. one or both of the transmitter Tx and the receiver Rx) may vary.

For example, the PTU 710 shown in the left half of FIG. 12 (e.g. the wireless charging transmitter 210) may limit the wireless charging power transmitted to the PRU 720 shown in the right half of FIG. 12 (e.g. the wireless charging receiver 220), and the PRU 720 may need to negotiate with the PTU 710 to guarantee the overall performance regarding wireless charging. For example, the PRU 720 may perform power polling on the PTU 710, and more particularly, may send a packet to the PTU 710 to ask for, for example, power up (e.g. increasing the wireless charging power) or power down (e.g. decreasing the wireless charging power). In addition, the PTU 710 may reply to the power polling of the PRU 720 with a simple response, without sending any packet, to notify the PRU 720 of whether the power polling is granted or rejected. This is for illustrative purposes only, and is not meant to be a limitation of the present invention. According to some embodiments, the packet sent from the PRU 720 to the PTU 710 may carry information regarding the power polling mentioned above.

According to some embodiments, a header field in the packet sent from the PRU 720 to the PTU 710 may carry header information. Examples of the header information may include, but not limited to, a predetermined header content "OVP" indicating an over-voltage condition OVP (e.g. the rectified voltage Vrect, which may be the DC voltage level Vrect with respect to a ground voltage level, at the output terminal of the rectifier within the wireless charging receiver circuit reaches, and more particularly, is greater than or equal to, a predetermined over-voltage threshold corresponding to a maximum allowable voltage level of the rectified voltage Vrect), a predetermined header content "DN" indicating a power down condition PWR-Dn (e.g. the PRU asks for power down), a predetermined header content "UP" indicating a power up condition PWR-Up (e.g. the PRU asks for power up), and a predetermined header content "OK" indicating a power OK condition PWR-OK (e.g. the PRU reports that the rectified voltage Vrect falls within a target range, such as an optimum voltage range of the rectified voltage Vrect).

Figure 13:
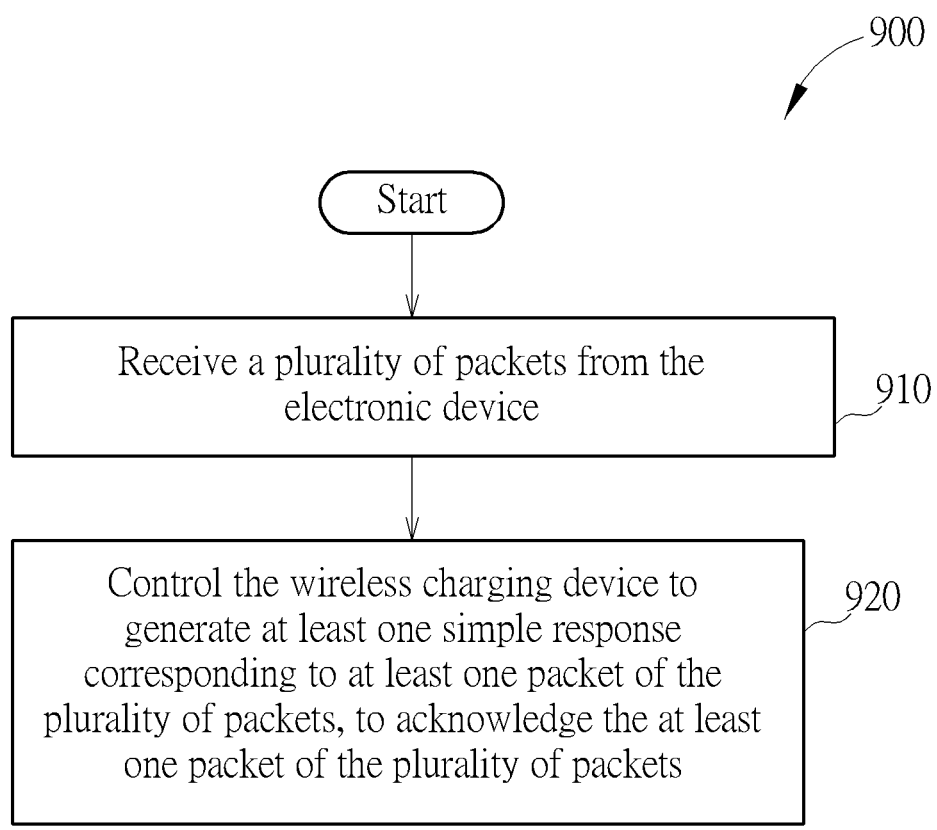
FIG. 13 illustrates a flowchart of a method for performing wireless charging control of an electronic device with aid of simple response of a wireless charging device according to another embodiment of the present invention.

FIG. 13 illustrates a flowchart of a method 900 for performing wireless charging control of an electronic device with aid of simple response of a wireless charging device according to another embodiment of the present invention. The method 900 shown in FIG. 13 can be applied to the wireless charging device such as the wireless charging transmitter 210, and more particularly, can be applied to the control circuit of the wireless charging device (e.g. the control circuit of the wireless charging transmitter 210), and can also be applied to the wireless power transfer system 200 of the embodiment shown in FIG. 2. This is for illustrative purposes only, and is not meant to be a limitation of the present invention. According to some embodiments, the method 900 shown in FIG. 13 can be applied to the PTU 710 shown in FIG. 12, and more particularly, can be applied to the control circuit of the PTU 710. The method can be described as follows.

In Step 910, the control circuit of the wireless charging device (e.g. the control circuit that may comprise at least one portion (e.g. a portion or all) of the architecture shown in FIG. 1) may receive a plurality of packets from the electronic device, for example, through the power output coil 218, where each packet of the plurality of packets may be utilized for carrying information of wireless charging reports of the electronic device, and may comprise unacknowledged header information. Examples of the plurality of packets mentioned in Step 910 may include, but not limited to, the aforementioned at least one random phase-delay packet mentioned in some embodiments described above. Examples of the unacknowledged header information may include, but not limited to, the predetermined header content "OVP" in the packet(s) mentioned in some of the embodiments described above, the predetermined header content "DN" in the packet (s) mentioned in some of the embodiments described above, the predetermined header content "UP" in the packet (s) mentioned in some of the embodiments described above, and the predetermined header content "OK" in the packet(s) mentioned in some of the embodiments described above.

In Step 920, the control circuit of the wireless charging device may control the wireless charging device to generate (for example, by using the transmitter Tx positioned within the wireless charging device, such as the wireless charging transmitter mentioned above, and more particularly, by using a power amplifier that is coupled to the control circuit of the wireless charging device, where both of the control circuit and the power amplifier are typically positioned within the wireless charging device), at least one simple response (e.g. one or more simple responses) corresponding to at least one packet (e.g. one or more packets) of the plurality of packets, to acknowledge the aforementioned at least one packet of the plurality of packets. For example, the control circuit of the wireless charging device may control the wireless charging device to generate the aforementioned at least one simple response corresponding to the aforementioned at least one packet of the plurality of packets, without sending information from the wireless charging device to the electronic device through any packet, to acknowledge the aforementioned at least one packet of the plurality of packets. More particularly, the wireless charging device does not send any packet to the electronic device for acknowledging the aforementioned at least one packet. Therefore, the present invention method and the associated apparatus (e.g. the method 900 and the apparatus 100) can keep power control loops of the wireless power transfer system 200 working by a simple one way communications control scheme, free from any dual way communications regulation, where power consumption can be reduced when the wireless charging device such as the wireless charging transmitter pad 210 is not transmitting any modulation signal (e.g. the wireless charging). In comparison with the related art, the present invention method and the associated apparatus can guarantee the overall performance, and the related art problems (e.g. the problem of increased costs, and the problem of insufficiency of the channels within the frequency band) can be prevented.

According to some embodiments, the aforementioned at least one packet of the plurality of packets mentioned in Step 910 may comprise at least one random phase-delay packet such as that mentioned in some of the embodiments described above, where each random phase-delay packet of the aforementioned at least one random phase-delay packet of these embodiment has a random phase-delay with respect to a time slot, and the aforementioned at least one random phase-delay packet of these embodiment is utilized for carrying information of at least one wireless charging report of the electronic device, such as that mentioned in some of the embodiments described above.

According to some embodiments, the aforementioned at least one simple response may comprise at least one pulse (e.g. one or more pulses) in the time domain or the frequency domain. For example, the electronic device may detect the aforementioned at least one simple response as acknowledgement of the aforementioned at least one packet of the plurality of packets mentioned in Step 910, having no need to perform decoding on the aforementioned at least one simple response.

According to some embodiments, the aforementioned at least one simple response may be detectable by the electronic device. For example, the electronic device may detect the aforementioned at least one simple response as acknowledgement of the aforementioned at least one packet of the plurality of packets mentioned in Step 910, having no need to perform decoding on the aforementioned at least one simple response.

Figure 14:
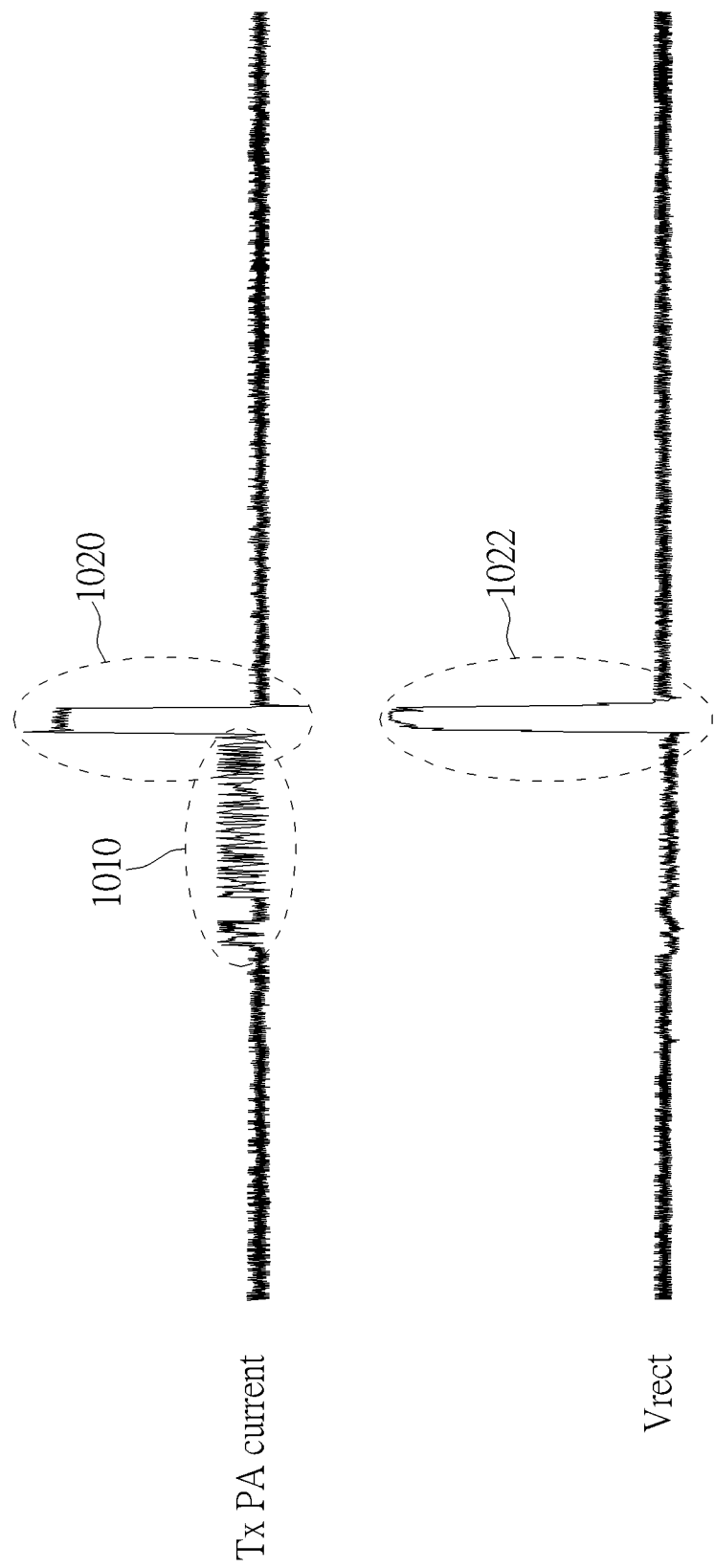
FIG. 14 illustrates a simple response control scheme involved with the method shown in FIG. 13 according to an embodiment of the present invention.

FIG. 14 illustrates a simple response control scheme involved with the method 900 shown in FIG. 13 according to an embodiment of the present invention. The curve shown in the upper half of FIG. 14 may represent the transmitter power amplifier (Tx PA) current of a Tx PA in the wireless charging device, such as the output current of the Tx PA, and the curve shown in the lower half of FIG. 14 may represent the rectified voltage Vrect of the wireless charging receiver 220, which may be regarded as the rectified voltage Vrect of a specific PRU within a plurality of PRUs, such as one of multiple PRUs wirelessly charged by the PTU. Please note that the Tx PA can be taken as an example of the aforementioned power amplifier of the wireless charging device. In addition, the Tx PA current can be taken as an example of the Tx current.

As shown in FIG. 14, there are some vibrations 1010 before the pulse 1020 in the waveforms of the Tx PA current, and these vibrations 1010 may correspond to Tx decoding (e.g. the transmitter pad 20 may decode some wireless charging reports from the specific PRU and generate these vibrations 1010 correspondingly). When the Tx decoding is completed, the control circuit of the wireless charging device may generate a single pulse such as the pulse 1020 in the waveforms of the Tx PA current, and may utilize this single pulse as the aforementioned at least one simple response of Step 920. In response to the aforementioned at least one simple response such as this single pulse (e.g. the pulse 1020), the rectified voltage Vrect of the specific PRU may vary correspondingly. As a result, there is a corresponding pulse 1022 in the waveforms of the rectified voltage Vrect of the specific PRU. Thus, the control circuit of the wireless charging device may control the wireless charging device to generate the aforementioned at least one simple response corresponding to the aforementioned at least one packet of the plurality of packets, without sending information from the wireless charging device to the electronic device through any packet, to acknowledge the aforementioned at least one packet of the plurality of packets mentioned in Step 910. According to this embodiment, as the electronic device (more particularly, the specific PRU) does not need to decode the aforementioned at least one simple response, the aforementioned at least one simple response is indeed simple, where the wireless charging device does not send any packet to the electronic device. For brevity, similar descriptions for this embodiment are not repeated in detail here.

Figure 15:
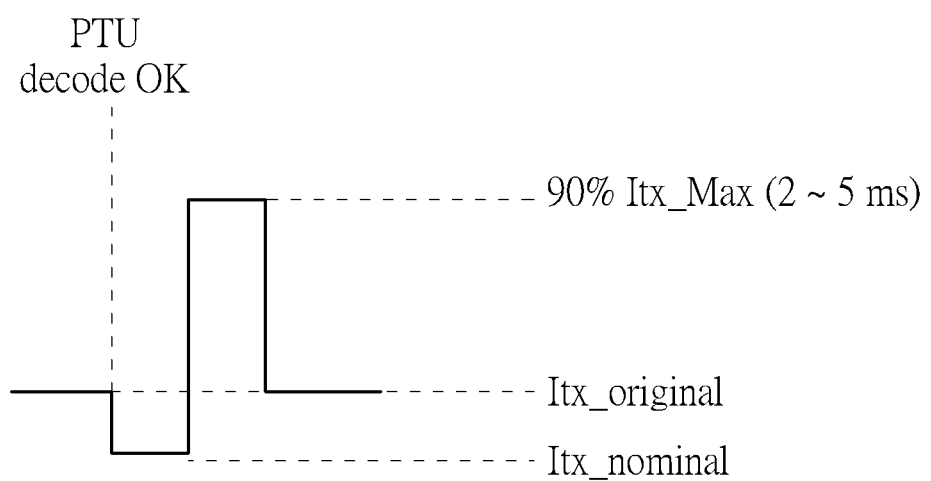
FIG. 15 illustrates a simple response involved with the method shown in FIG. 13 according to an embodiment of the present invention.

FIG. 15 illustrates a simple response (e.g. a single pulse such as that mentioned above) involved with the method 900 shown in FIG. 13 according to an embodiment of the present invention. For better comprehension, the simple response control scheme shown in FIG. 14 can still be applied to a PTU such as that mentioned in some of the embodiments described above, and the control circuit of the wireless charging device may control the Tx PA current of the Tx PA of this PTU to generate the single pulse according to the waveforms shown in FIG. 15.

As shown in FIG. 15, the Tx PA current may be originally kept at the transmitter original current Itx_original. When the aforementioned Tx decoding is completed (e.g. the so-called PTU decode OK in FIG. 15, for better comprehension), the control circuit of the wireless charging device may control the Tx PA current to stay at the transmitter nominal current Itx_nominal for a while, and then control the Tx PA current to become 90% of the transmitter maximum current Itx_Max for a predetermined time period such as a fixed time period falling within the range starting from 2 ms through to 5 ms, to form the rising edge of the single pulse. Afterward, the control circuit of the wireless charging device may control the Tx PA current to be at the transmitter original current Itx_original again, to form the falling edge of the single pulse. As a result, the single pulse can be easily and correctly detected by the electronic device (more particularly, by the PRU). For brevity, similar descriptions for this embodiment are not repeated in detail here.

Figures 16, 17:
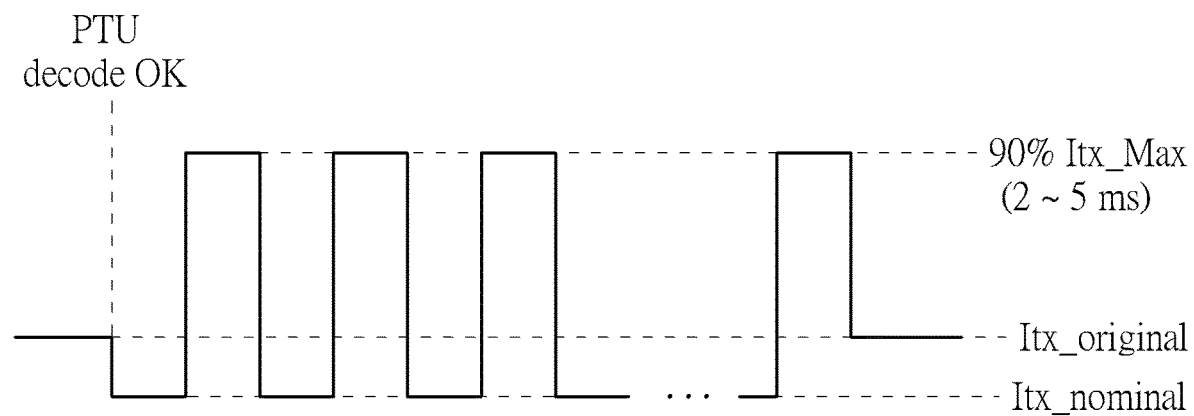
FIG. 16 illustrates a simple response involved with the method shown in FIG. 13 according to another embodiment of the present invention.
FIG. 17 illustrates a simple response involved with the method shown in FIG. 13 according to another embodiment of the present invention.

FIG. 16 illustrates a simple response (e.g. a pulse chain such as a series of pulses) involved with the method 900 shown in FIG. 13 according to another embodiment of the present invention. For better comprehension, the simple response control scheme shown in FIG. 14 can still be applied to a PTU such as that mentioned in some of the embodiment described above, except that the single pulse is replaced by the series of pulses, where the control circuit of the wireless charging device may control the Tx PA current of the Tx PA of this PTU to generate the series of pulses according to the waveforms shown in FIG. 16.

As shown in FIG. 16, the Tx PA current may be originally kept at the transmitter original current Itx_original. When the aforementioned Tx decoding is completed (e.g. the so-called PTU decode OK in FIG. 16, for better comprehension), the control circuit of the wireless charging device may control the Tx PA current to stay at the transmitter nominal current Itx_nominal for a while, and then control the Tx PA current to become 90% of the transmitter maximum current Itx_Max for a predetermined time period such as a fixed time period falling within the range starting from 2 ms through to 5 ms, to form the rising edge of the first pulse of the series of pulses.

Afterward, the control circuit of the wireless charging device may control the Tx PA current to be at the transmitter nominal current Itx_nominal again, to form the falling edge of the first pulse of the series of pulses. The remaining pulse of the series of pulses may be generated in a similar manner, except that the control circuit of the wireless charging device may control the Tx PA current to be at the transmitter original current Itx_original to form the falling edge of the last pulse of the series of pulses. As a result, the series of pulses can be easily and correctly detected by the electronic device (more particularly, by the PRU). For brevity, similar descriptions for this embodiment are not repeated in detail here.

FIG. 17 illustrates a simple response (e.g. a single pulse in a frequency domain) involved with the method 900 shown in FIG. 13 according to another embodiment of the present invention. For example, the control circuit of the wireless charging device may utilize a frequency shift keying (FSK) simple response method (labeled "FSK" in FIG. 17, for brevity) for controlling the single pulse in the frequency domain. This is for illustrative purposes only, and is not meant to be a limitation of the present invention. According to some embodiments, the control circuit of the wireless charging device may utilize another method for controlling the single pulse in the frequency domain.

According to this embodiment, the control circuit of the wireless charging device may control the Tx PA current to originally carry a predetermined frequency 6.78 megahertz (MHz), and then change in the frequency domain to become another predetermined frequency 6.79 MHz, to form the rising edge of the single pulse in the frequency domain. Afterward, the control circuit of the wireless charging device may control the Tx PA current to change in the frequency domain to become the predetermined frequency 6.78 MHz again, to form the falling edge of the single pulse in the frequency domain. As a result, the single pulse in the frequency domain can be easily and correctly detected by the electronic device (more particularly, by the PRU). For brevity, similar descriptions for this embodiment are not repeated in detail here.

According to some embodiments, the pulse in the frequency domain may be replaced by a series of pulses in the frequency domain. For example, the control circuit of the wireless charging device may control the Tx PA current to originally carry a predetermined frequency 6.78 MHz, and then change in the frequency domain to become another predetermined frequency 6.79 MHz, to form the rising edge of the first pulse of the series of pulses in the frequency domain. Afterward, the control circuit of the wireless charging device may control the Tx PA current to change in the frequency domain to become the predetermined frequency 6.78 MHz again, to form the falling edge of the first pulse of the series of pulses in the frequency domain. The remaining pulse of the series of pulses in the frequency domain may be generated in a similar manner. As a result, the series of pulses in the frequency domain can be easily and correctly detected by the electronic device (more particularly, by the PRU). For brevity, similar descriptions for these embodiments are not repeated in detail here.

According to some embodiments, a PRU of the plurality of PRUs, such as the specific PRU (e.g. a target PRU), may send a random delay packet containing unacknowledged header information. The PTU mentioned in the embodiment shown in FIG. 15 may response with the transmitter nominal current Itx_nominal for 2 ms and a rising pulse having a specific pulse height of a known percentage (e.g. 90%) of the transmitter maximum current Itx_Max and having a specific pulse width (e.g. from 2 ms to 5 ms) when decoding OK. In addition, the PRU may detect the rising or falling behaviors of the rectified voltage Vrect and the associated timing to determine whether the unacknowledged header information (e.g. the predetermined header content "OVP" in the packet mentioned in Step 712, the predetermined header content "DN" in the packet mentioned in Step 722, the predetermined header content "UP" in the packet mentioned in Step 732, or the predetermined header content "OK" in the packet mentioned in Step 740) is granted by the PTU. If the PRU cannot detect an abrupt change of the rectified voltage Vrect (e.g. the so-called Vrect jump), then the PRU may keep sending random delay packets having the same content of the unacknowledged header information again and again, to make sure that the PTU can decode this message (more particularly, can be notified of the unacknowledged header information). This is for illustrative purposes only, and is not meant to be a limitation of the present invention. According to some embodiments, some other simple response method without complicated encode/decode request to prevent from false detection may be applied. For example, a pulse chain such as that mentioned above, rather than a single pulse, may be utilized as the aforementioned at least one simple response of Step 920. In some examples, the control circuit of the PTU may utilize the FSK simple response method mentioned in the embodiment shown in FIG. 17, to perform frequency modulation of changing from or to the original frequency 6.78 MHz. In addition, the associated modulation result of the frequency may fall within a predetermined frequency range, where the predetermined frequency range may be greater than or equal to a lower limit frequency of (6.78 MHz−10 kHz), and may be less than or equal to an upper limit frequency of (6.78 MHz+10 kHz).

According to some embodiments, the PRU may further fix the packet delay time and send the subsequent packets with acknowledged header information once it is acknowledged by the PTU. In addition, the PTU may reduce the size of the detection window to be equal to the slot time of the PRU when all packets are decoded OK with acknowledged header information. Additionally, the PRU may synchronize the packet delay time with the resonant frequency of the PTU to diminish the timing drift between the PTU and the PRU. Further, the PRU may issue (or send) an unacknowledged packet after a long time (e.g. a time period from one minute to ten minutes, or another length of time) to prevent possible false detection or timing drift if timing synchronization is supported. For brevity, similar descriptions for these embodiments are not repeated in detail here.

Figure 18:
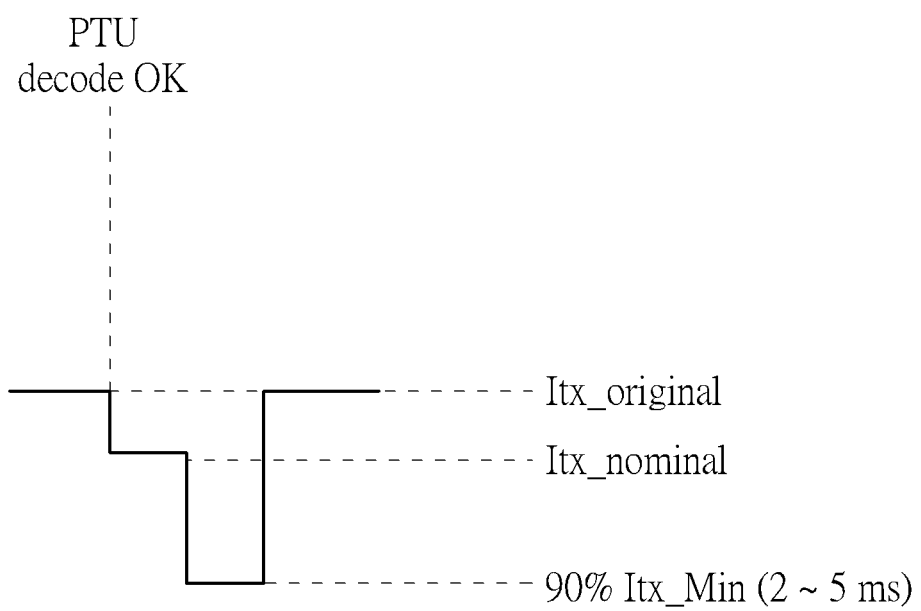
FIG. 18 illustrates a simple response involved with the method shown in FIG. 13 according to another embodiment of the present invention.

FIG. 18 illustrates a simple response involved with the method 900 shown in FIG. 13 according to another embodiment of the present invention. In comparison with the simple response shown in FIG. 15, the pulse within the simple response may be altered in this embodiment. For better comprehension, the pulse within the simple response shown in FIG. 15 can be regarded as a positive pulse (e.g. a pull-up pulse toward the positive direction), and the pulse within the simple response shown in FIG. 18 can be regarded as a negative pulse (e.g. a pull-down pulse toward the negative direction), where the positive pulse is replaced by the negative pulse in this embodiment. As a result, the positive pulse and the negative pulse may indicate different meanings, respectively. For example, the positive pulse may indicate that the power polling mentioned in the embodiment shown in FIG. 12 (e.g. the power polling corresponding to a packet of the plurality of packets mentioned in Step 910) is granted, and the negative pulse may indicate that the power polling mentioned in the embodiment shown in FIG. 12 (e.g. the power polling corresponding to another packet of the plurality of packets mentioned in Step 910) is rejected. For brevity, similar descriptions for this embodiment are not repeated in detail here.

In the embodiment shown in FIG. 18, the negative pulse may correspond to 90% of the transmitter minimum current Itx_Min for a predetermined time period such as a fixed time period falling within the range starting from 2 ms through to 5 ms. This is for illustrative purposes only, and is not meant to be a limitation of the present invention. In some embodiments, the voltage level of the negative pulse may vary. For brevity, similar descriptions for these embodiments are not repeated in detail here.

According to some embodiments, an output-requesting PRU such as the PRU 720 may send to the PTU 710 a packet containing the rectifier power parameter P_rec for the PRU 720, such as a lower power value corresponding to a category of lower power, where the rectifier power parameter P_rec may indicate that the PRU 720 wishes the rectifier power of the rectifier therein to become equivalent to the rectifier power parameter P_rec. For example, the PRU 720 may need 10 Watts (W), but the PRU 720 may initially ask for a small power value such as 1 W. When the request corresponding to the small power value such as 1 W is granted by the PTU 710, the PRU 720 may then ask for another power value with an increment, such as 2 W. When the request corresponding to the second power value such as 2 W is granted by the PTU 710, the PRU 720 may then ask for yet another power value with an increment, such as 3 W. Thus, the PRU 720 may ask for the power value(s) step by step, rather than initially asking for a large power value such as 10 W. For example, the PRU 720 may obtain the requested power from the PTU 710 when the request from the PRU 720 is granted, and afterward (e.g. 10 seconds later), the PRU 720 may send out the next request corresponding to the next achievable power category, and the PTU 710 may response to the next request. As a result, the related art problem such as a system crash (e.g. the system crash due to insufficient charging capability of a conventional wireless charging device) will never occur. This is for illustrative purposes only, and is not meant to be a limitation of the present invention. According to some embodiments, the PRU 720 is capable of limiting the output current of the rectifier therein, and more particularly, limiting to this category that the PRU 720 belongs to.

Please note that the PTU 710 may sum up the total power of the PRU 720 to determine the total power parameter Prec_max_total, which is equivalent to the corresponding to sum up result. For example, in a situation where there is only one PRU to be wireless charged by the PTU 710, such as the PRU 720, the total power parameter Prec_max_total may be equivalent to the average wireless charging power. In another example, in a situation where there are multiple PRUs to be wireless charged by the PTU 710, such as the plurality of PRUs, for those output-enabled PRUs against the PTU 710, the total power parameter Prec_max_total may be updated by (Prec_sum_ave* device_number), i.e. the product of the average power Prec_sum_ave of all of these PRUs and the PRU count device_number of these PRUs. As a result, the PTU 710 may determine whether to grant or reject a request from a PRU (e.g. the PRU 720 or any of the PRUs), such as the request mentioned in some of the embodiments described above.

In addition, when the total power parameter Prec_max_total is not over the maximum class of the PTU 710, the PTU 710 may response with a nominal current (e.g. with a length of time being equivalent to 2 ms) and then a rising pulse (e.g. the positive pulse) of a known percentage of the transmitter maximum current Itx_Max (e.g. with a length of time falling within the range of 2 ms to 5 ms) to indicate that the request from the output-requesting PRU (e.g. the PRU 720) is granted to turn on the charging port. However, when the total power parameter Prec_max_total is over the maximum class of the PTU 710, the PTU 710 may response a nominal current (e.g. with a length of time being equivalent to 2 ms) and then a falling pulse (e.g. the negative pulse) of a known percentage of the transmitter minimum current Itx_Min (e.g. with a length of time falling within the range of 2 ms to 5 ms) to indicate that the request from the output-requesting PRU (e.g. the PRU 720) is rejected. In addition, the output-requesting PRU may detect the rising and/or falling behavior (s) of the rectified voltage Vrect and the associated timing to determine whether its request is granted by the PTU 710. Additionally, when the PRU 720 cannot detect an abrupt change of the rectified voltage Vrect (e.g. the so-called Vrect jump), the PRU 720 may send the same packet again to make sure the PTU 710 can decode this message. This is for illustrative purposes only, and is not meant to be a limitation of the present invention. According to some embodiments, some other simple response method without complicated encode/decode request to prevent from false detection may be applied. For example, a pulse chain such as that mentioned above, rather than a single pulse, may be utilized as the aforementioned at least one simple response of Step 920. In some examples, the control circuit of the PTU may utilize the FSK simple response method mentioned in the embodiment shown in FIG. 17, to perform frequency modulation of changing from or to the original frequency 6.78 MHz. In addition, the associated modulation result of the frequency may fall within a predetermined frequency range, where the predetermined frequency range may be greater than or equal to a lower limit frequency of (6.78 MHz−10 kHz), and may be less than or equal to an upper limit frequency of (6.78 MHz+10 kHz).

According to some embodiments, the PTU 710 may operate according to a PTU detection control scheme to prevent a system crash of a PRU that is not supporting power adjusting function. For example, the PTU 710 may detect whether the transmitter current Itx is keep dropping when the Tx PA has reached its maximum output. If above condition is confirmed over certain times, the PTU 710 may enter a latching fault state to notify the user that he/she should remove this PRU from the PTU 710. For example, the PTU 710 may operate according to a FOD control scheme such as that taught in some of the embodiments described above, to determine whether this PRU has been removed from the PTU 710. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing wireless charging control of an electronic device by a wireless charging device arranged to wirelessly charge the electronic device, the method comprising the steps of:
   receiving, by the wireless charging device, a plurality of packets from the electronic device, wherein the plurality of packets include wireless charging reports of the electronic device;
   controlling the wireless charging device to transmit a plurality of responses to acknowledge the plurality of packets, the plurality of responses comprising a plurality of pulses in the time domain or the frequency domain; and
   controlling the wireless charging device to perform wireless charging of the electronic device based on the wireless charging reports,
   wherein the electronic device detects the plurality of responses as acknowledgement of the plurality of packets.

2. The method of claim 1, wherein the step of controlling the wireless charging device to transmit the plurality of responses to acknowledge the plurality of packets further comprises:
   controlling the wireless charging device to transmit the plurality of responses without sending information from the wireless charging device to the electronic device through any packet, to acknowledge the plurality of packets.

3. The method of claim 1, wherein the wireless charging device does not send any packet to the electronic device to acknowledge the plurality of packets.

4. The method of claim 1, wherein the plurality of packets comprises at least one random phase-delay packet, wherein each random phase-delay packet of the at least one random phase-delay packet has a random phase-delay with respect to a time slot, and the at least one random phase-delay packet is utilized for carrying information of at least one wireless charging report of the electronic device.

5. The method of claim 1, wherein the plurality of pulses comprises a positive pulse.

6. The method of claim 5, wherein the plurality of pulses further comprises a negative pulse; and the positive pulse and the negative pulse indicate different meanings, respectively.

7. The method of claim 6, wherein the positive pulse indicates that power polling corresponding to a packet of the plurality of packets is granted, and the negative pulse indicates that power polling corresponding to another packet of the plurality of packets is rejected.

8. The method of claim 1, wherein the plurality of pulses comprises a negative pulse.

9. The method of claim 1, wherein the plurality of pulses includes a single pulse to acknowledge at least one packet.

10. The method of claim 1, wherein controlling the wireless charging device to perform wireless charging of the electronic device based on the wireless charging reports comprises performing foreign object detection (FOD) based on the wireless charging reports and performing the wireless charging when the FOD indicates no foreign object is present.

11. An apparatus for performing wireless charging control of an electronic device by a wireless charging device arranged to wirelessly charge the electronic device, the apparatus comprising at least one portion of the wireless charging device, the apparatus comprising:

a transmitter, positioned within the wireless charging device, arranged for outputting a transmitter current; and a control circuit, positioned within the wireless charging device and coupled to the transmitter, arranged for receiving a plurality of packets from the electronic device through a power output coil of the wireless charging device, wherein the plurality of packets carry wireless charging reports of the electronic device, wherein the control circuit is further arranged for controlling the wireless charging device to transmit, by using the transmitter, a plurality of responses, to acknowledge the plurality of packets, the plurality of responses comprising a plurality of pulses in the time domain or the frequency domain, wherein the transmitter is arranged to output the transmitter current to the power output coil to perform wireless charging of the electronic device based on the wireless charging reports, wherein the electronic device detects the plurality of responses as acknowledgement of the plurality of packets.

12. The apparatus of claim 11, wherein the control circuit controls the wireless charging device to transmit the plurality of responses without sending information from the wireless charging device to the electronic device through any packet, to acknowledge the plurality of packets.

13. The apparatus of claim 11, wherein the wireless charging device does not send any packet to the electronic device to acknowledge the plurality of packets.

14. The apparatus of claim 11, wherein the plurality of packets comprises at least one random phase-delay packet, wherein each random phase-delay packet of the at least one random phase-delay packet has a random phase-delay with respect to a time slot, and the at least one random phase-delay packet is utilized for carrying information of at least one wireless charging report of the electronic device.

15. The apparatus of claim 11, wherein the plurality of pulses comprises a positive pulse.

16. The apparatus of claim 15, wherein the plurality of pulses further comprises a negative pulse; and the positive pulse and the negative pulse indicate different meanings, respectively.

17. The apparatus of claim 16, wherein the positive pulse indicates that power polling corresponding to a packet of the plurality of packets is granted, and the negative pulse indicates that power polling corresponding to another packet of the plurality of packets is rejected.

18. The apparatus of claim 11, wherein the plurality of pulses comprises a negative pulse.

19. The apparatus of claim 11, wherein the plurality of pulses includes a single pulse to acknowledge at least one packet.

* * * * *